United States Patent
Akhtar et al.

(10) Patent No.: US 12,452,211 B2
(45) Date of Patent: Oct. 21, 2025

(54) METHOD FOR DYNAMICALLY DETECTING CHANGING SaaS APPS TRAFFIC USING ML AND URI TOKENIZATION

(71) Applicant: Palo Alto Networks, Inc., Santa Clara, CA (US)

(72) Inventors: Muhammad Akhtar, San Jose, CA (US); Sanchita Dutta, Union City, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 147 days.

(21) Appl. No.: 18/215,543

(22) Filed: Jun. 28, 2023

(65) Prior Publication Data
US 2025/0007882 A1  Jan. 2, 2025

(51) Int. Cl.
*H04L 9/40* (2022.01)
*H04L 41/16* (2022.01)

(52) U.S. Cl.
CPC .......... *H04L 63/0236* (2013.01); *H04L 41/16* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 11,799,734 B1 * | 10/2023 | Strong | H04L 41/16 |
| 2019/0268305 A1 * | 8/2019 | Xu | G06F 16/285 |
| 2020/0351279 A1 * | 11/2020 | Dennison | G06F 21/552 |
| 2021/0120034 A1 * | 4/2021 | Starov | G06F 16/2379 |
| 2022/0014963 A1 * | 1/2022 | Yeh | G06N 3/045 |
| 2022/0121984 A1 * | 4/2022 | Gupta | G06N 20/20 |
| 2024/0037443 A1 * | 2/2024 | You | G06F 16/958 |
| 2024/0296231 A1 * | 9/2024 | Ramanan | G06F 21/577 |

* cited by examiner

*Primary Examiner* — June Sison
(74) *Attorney, Agent, or Firm* — Van Pelt, Yi & James LLP

(57) ABSTRACT

The present application discloses a method, system, and computer system for classifying stream data at an edge device. The method includes (i) monitoring network traffic, wherein the monitored network traffic is stored in a network traffic log, (ii) determining an application identifier (ID) associated with a URL obtained from the network traffic log based at least in part on a combination of a URI ranking and a machine learning based URI application classification, and (iii) enforcing a policy with respect to network traffic based at least in part on the application ID.

20 Claims, 11 Drawing Sheets

| No. | Token | Term count | | | | Document count | IDF | TF × IDF | | | |
|---|---|---|---|---|---|---|---|---|---|---|---|
| | | Doc 1 | Doc 2 | Doc 3 | Doc 4 | | | Doc 1 | Doc 2 | Doc 3 | Doc 4 |
| 1 | slack | 0.2 | 0.2 | 0.2 | 0.2 | 4 | 0 | 0 | 0 | 0 | 0 |
| 2 | com | 0.2 | 0.2 | 0.2 | 0.2 | 4 | 0 | 0 | 0 | 0 | 0 |
| 3 | api | 0.2 | 0.2 | 0.2 | 0.2 | 4 | 0 | 0 | 0 | 0 | 0 |
| 4 | files | 0.2 | 0 | 0 | 0 | 1 | 0.602 | 0.12 | 0 | 0 | 0 |
| 5 | list | 0.2 | 0 | 0 | 0 | 1 | 0.602 | 0.12 | 0 | 0 | 0 |
| 6 | subteams | 0 | 0.2 | 0 | 0 | 1 | 0.602 | 0 | 0.12 | 0 | 0 |
| 7 | membership | 0 | 0.2 | 0 | 0 | 1 | 0.602 | 0 | 0.12 | 0 | 0 |
| 8 | links | 0 | 0 | 0.2 | 0 | 1 | 0.602 | 0 | 0 | 0.12 | 0 |
| 9 | getdomains | 0 | 0 | 0.2 | 0 | 1 | 0.602 | 0 | 0 | 0.12 | 0 |
| 10 | client | 0 | 0 | 0 | 0.2 | 1 | 0.602 | 0 | 0 | 0 | 0.12 |
| 11 | counts | 0 | 0 | 0 | 0.2 | 1 | 0.602 | 0 | 0 | 0 | 0.12 |

METHOD FOR DYNAMICALLY DETECTING CHANGING SaaS APPS TRAFFIC USING ML AND URI TOKENIZATION

BACKGROUND OF THE INVENTION

Applications, such as enterprise applications or other software-as-a-service (SaaS) products, are increasingly being implemented by organizations. As organizations grow or become more complex the set of applications used in the enterprise generally increases. At scale, organizations have numerous applications which are oftentimes provided by different vendors.

Organizations generally define a manner by which network traffic is to be handled based on the application, or type of application, with which the network traffic is associated. For example, organizations desire to block certain applications. Certain employers may desire to block employees' access to social media sites/applications or entertainment streaming applications, etc.

Software-as-a-Service (SaaS) vendors generally build multiple applications and configure the applications to be accessible via a single domain. For example, the SaaS vendor uses subdomains or URI path parameters to differentiate among the applications accessible via the single domain.

BRIEF DESCRIPTION OF THE DRAWINGS

Various embodiments of the invention are disclosed in the following detailed description and the accompanying drawings.

FIG. 3 is a diagram of chart of a tokenization and a term frequency-inverse document frequency (TF-IDF) vectorization.

DETAILED DESCRIPTION

Figure 1:
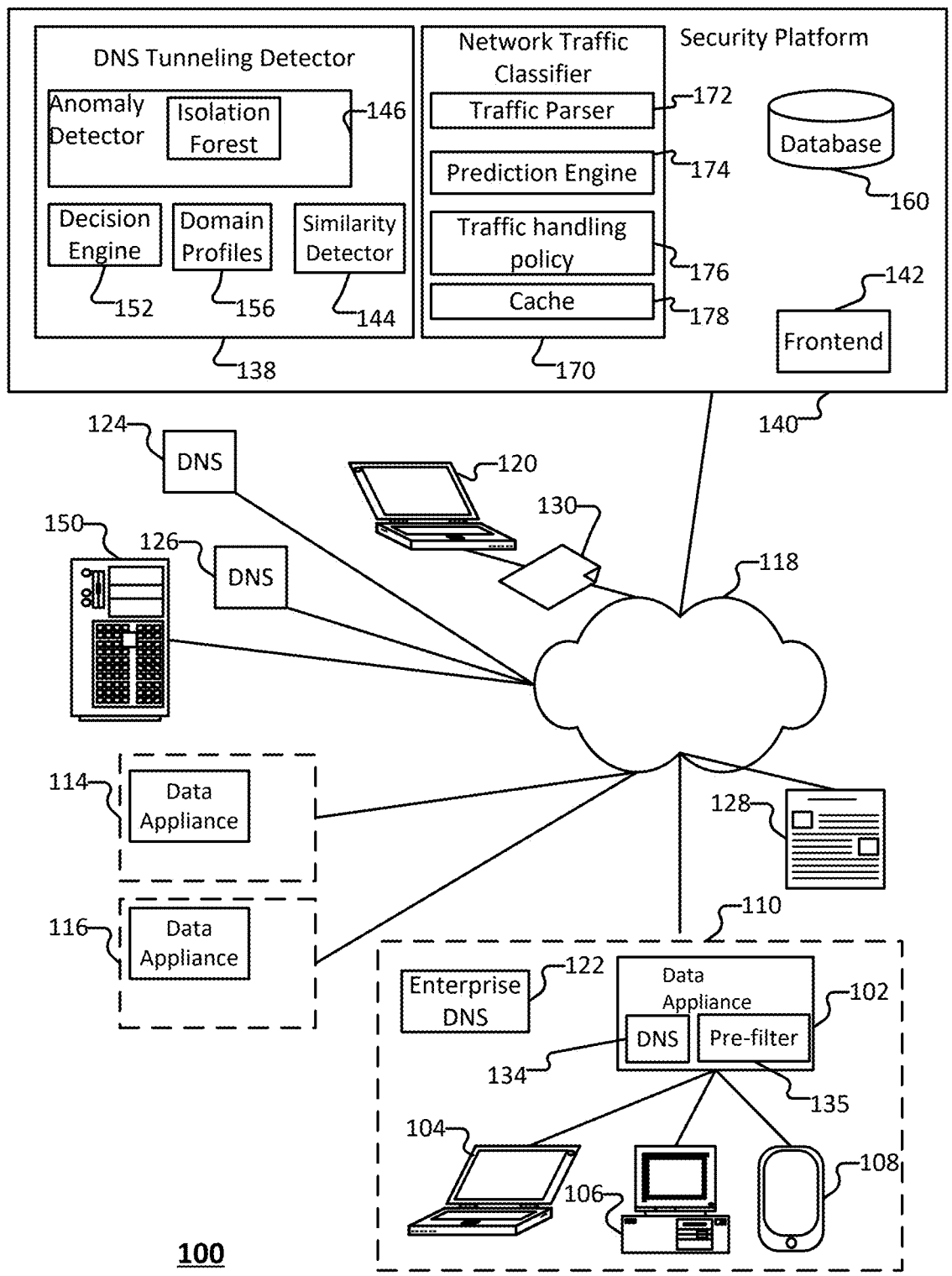
FIG. 1 is a block diagram of an environment in which a network traffic is classified according to various embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

As used herein, a URL (Uniform Resource Locator), HTMLs, URI (Uniform Resource Identifier) access paths, or other files or network traffic.

As used herein, an inline security entity may include a network node (e.g., a device) that enforces one or more security policies with respect to information such as network traffic, files, etc. As an example, a security entity may be a firewall. As another example, an inline security entity may be implemented as a router, a switch, a DNS resolver, a computer, a tablet, a laptop, a smartphone, etc. Various other devices may be implemented as a security entity. As another example, an inline security entity may be implemented as an application running on a device, such as an anti-malware application. As another example, an inline security entity may be implemented as an application running on a container or virtual machine.

Related art systems detect applications in network traffic based on conventional signature-based approaches. Such signature-based approaches allow the creation of network packet traffic patterns that are matched against real-time network http traffic to identify an app. However, a Software-as-a-Service (SaaS) vendor may change the application configuration, such as change the access URI or http payload. Such a change to the application configuration results in a change to the traffic pattern thereby causing the signature used to identify the app (e.g., to match the network traffic against) to become obsolete. In addition to the configuration to include additional/alterative access URIs, http traffic pattern for granular activities within a single SaaS application may can change thereby resulting in activity not being recognized by signatures of conventional signature-based approaches.

As an illustrative example, the path http://drive.google.com is used to access the Google Drive application. However, an additional/alterative access URI (e.g., www.google.com/drive) for Google Drive was recently added. Related art systems the deploy traditional signature-based approaches will fail to detect http traffic in the URI. Further, if the set of signatures against which related art systems match network traffic include a pattern for the access path www.google.com, then traffic to the additional/alterative access URI (e.g., www.google.com/drive) may be mischaracterized as the base Google app associated with the access path www.google.com.

Various embodiments use a combination of a URL ranking-based application classification and a supervised machine learning based URL application classification technique to detect SaaS applications and activities based on network traffic logs (e.g., application http traffic logs). In some embodiments, the system uses URL tokenization to identify the various keywords present in the URI for a SaaS application. The system tokenizes the network traffic URI and compares the tokens (e.g., a set of sample tokens obtained based on the tokenization) against the tokens present in a repository of sets of tokens associated with various applications (e.g., a SaaS URI repository for various applications). The system uses the comparison between the set of sample tokens and the tokens comprised in the repository to determine which URI has the highest match and to rank, based on match count, the matchings of the set of sample tokens to sets of predefined tokens for applications. The use of the URL-ranking based application classification may give partially accurate results because some keywords may have different usage in different SaaS application contexts. In some embodiments, the system uses an assemble of the URL ranking-based application and the machine learning-based URL application classification to overcome the potential for partially accurate results arising from the URL-ranking based application classification. For example, the system feeds the top ranked applications from tokenization (e.g., from the URL ranking-based application classification) to a machine learning pipeline. The machine learning pipeline may be trained on URL patterns and corresponding application matches. The machine learning pipeline is used to further verify the results. For example, if the verdict (e.g., predicted classification) from the machine learning-based URL application classification matches the verdict (e.g., predicted classification) from URL ranking-based application classification, the system accordingly classifies the network traffic sample (e.g., the system deems the network traffic to be the corresponding application). In response to classifying the network traffic, the system may send the verdict (e.g., predicted classification) downstream, such as to other network entities (e.g., security entities such as firewalls, etc.) or to a service for storing a signature of the network traffic in association with the predicted classification (e.g., for future classification based on the signature).

Various embodiments include a device, method, and system for classifying network traffic. The method includes (i) monitoring network traffic, wherein the monitored network traffic is stored in a network traffic log, (ii) determining an application identifier (ID) associated with a URL obtained from the network traffic log based at least in part on a combination of a URI ranking and a machine learning based URI application classification, and (iii) enforcing a policy with respect to network traffic based at least in part on the application ID.

Various embodiments dynamically improve application classification of network traffic based on the use of the combination of a URI ranking-based application classification and a machine learning-based URI application classification. The use of such combined application classifications enables the system to update signatures mapped to certain applications. Accordingly, the system accurately classifies/detects network traffic even if an access path(s) for an application changes or an additional/alternative access path for the application is configured.

In some embodiments, in response to determining that a sample (e.g., a network traffic sample obtained from a network traffic log) is to be characterized, the system implements a URI ranking-based application classification to determine an application (e.g., an application from a set of predefined applications) that matches the sample. The URI ranking-based application classification (or which may also be referred to herein as a URL ranking-based application classification or ranking-based application classification) includes obtaining access path information (e.g., the URI or URL) comprised in the sample. In response to obtaining the access path information, the system tokenizes the access path information, such as according to a predefined tokenization scheme/method. The system obtains a set of sample tokens based on the tokenization of the access path information. The system uses the set of sample tokens to perform a matching with respect to tokens for a set of predefined applications (e.g., a catalog of previously classified applications). The predicted classification associated with the URI ranking-based application classification may be the application of the set of predefined applications to which the sample most closely matches (e.g., based on a matching of corresponding tokens).

Various tokenization schemes/methods may be implemented. An example of the predefined tokenization scheme/method includes obtaining the access path (e.g., the URL or URI), discarding (or ignoring) the top private domain from the access path, and parsing the remainder of the access path to obtain a set of sample tokens associated with the sample (e.g., the particular network traffic being classified). The parsing of the remainder of the access path to obtain the set of sample tokens may include determining strings (e.g., alphanumeric strings) in the access path and deeming such strings as tokens for the set of sample tokens. The determining the strings in the access path includes identifying a predefined separator(s) and obtaining the string(s) after each separator (or between set of separators). Various types of separators may be implemented (e.g., periods, colon, forward slash, backwards slash, comma, hyphen, etc.). In some embodiments, the predefined separator is a period and/or forward slash (e.g., "/") and the system thus obtains strings after each period or forward slash within the access path (e.g., with the exception of the top-level domain or the top private domain). As an illustrative example, for a URL equal to boardpackager.box.com/app-redir/login/z-app-value, the system converts the URL to the following tokens: 'boardpackager'; 'box'; 'com'; 'app-redir'; 'login'; and 'z-app-value'. As another illustrative example, for a URL equal to slackcom/api/files.list, the system converts the URL to the following tokens: 'slack'; 'com'; 'api'; 'files'; and 'list'. In some embodiments, the system extracts the top most private domain from the access path and tokenizes the remaining subdomains and path up to two levels. The system may also discard/ignore certain tokens which may be generic across network traffic, such as 'www', 'com', etc.

In some embodiments, in response to obtaining the set of sample tokens for the sample (e.g., the network traffic being analyzed/classified), the system query matches against a set of tokens for a predefined set of applications. For example, the system stores a mapping of sets of tokens to the predefined applications (e.g., a set of applications in a catalog). The set of predefined applications may correspond to applications that have been previously classified/characterized, such as by the system, another system or service (e.g., a third-party service), or a community-based classification. As an example, the set of predefined applications may correspond to applications associated with the top-level domain (e.g., top-level private domain), which have been previously analyzed/classified (e.g., by the system or another system or service). In connection with obtaining a predicted classification using the URI ranking-based classification method, the system determines an application (e.g., from among the set of predefined applications) for which the set of sample tokens most closely match the set of tokens for the application. As an example, the system determines the closest match between the set of sample tokens and the set of tokens for various applications based on performing a match count, such as to determine a number of tokens among the set of sample tokens that match (e.g., are identical) to a token in the set of tokens for a particular application. In some embodiments, the system performs a ranking of the match count for various applications among the set of predefined applications. The highest ranked application (e.g., the application for which the number of matches of the set of sample tokens with the set of tokens for a particular application) is deemed to be the predicted classification for the URI ranking-based classification method. As an example, the predicted classification corresponds to an application identifier (e.g., an identifier that uniquely identifies the application).

In some embodiments, the system extracts the top-most private domain from the access path (e.g., the URL) and tokenizes the remaining sub domains and path up to two levels. The system runs a query match against the private domain to retrieve all possible matching applications for the same vendor (e.g., a set of predefined applications against which the matching analysis is performed). The system iterates through each matching application and for each token (e.g., each token from the set of sample tokens) the system determines whether the particular token matches a token associated with the particular application. The system identifies the matches among such tokens and sums the number of matches for the set of sample tokens with respect to the particular application. The application with the highest number total match count is selected as the match for the access path.

In some embodiments, the system obtains a predicted classification using a machine learning-based application classification system. The system queries a model (e.g., a machine learning model) to predict an application classification (e.g., application identifier) associated with the particular sample of network traffic. In some embodiments, the system queries the model (e.g., a classifier) based at least in part on the access path. For example, the system determines a feature vector corresponding to the access path, and queries the model based on the feature vector.

In some embodiments, the system determines the feature vector for the access path (e.g., the URI or URL) based at least in part on performing a tokenization of the access path. The system may determine the feature vector based on a set (or a subset) of tokens obtained by the tokenization. As an example, the feature vector may be based at least in part on the frequency of the tokens. In some embodiments, the feature vector is determined based at least in part on a term frequency-inverse document frequency (TF-IDF) for the set (or a subset) of tokens obtained by the tokenization of the access path. For example, the system converts a URL to a vector based on the frequency count of each word (e.g., each token parsed from the URL). The system may remove outliers from the set of tokens from which the feature vector is generated. For example, the system may exclude the token (e.g., words, alphanumeric strings, etc.) that has the highest frequency, and exclude the token that has the lowest frequency. As another example, the system may exclude a predefined number (or predefined percentage) of tokens that are the set of N highest frequency tokens and a predefined number of tokens that are the set of M lowest frequency tokens, where N and M are integers.

The system implements a model (e.g., a classifier) to classify the network traffic based on the feature vector. The system may train the model, or the system may obtain the model from a service. The model is trained based at least in part on a machine learning process. Examples of machine learning processes that can be implemented in connection with training the model(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, etc. In some embodiments, the system trains a KNN model. As an example, the system inputs the feature vector (e.g., the TF-IDF feature vector) to the model (e.g., the KNN machine learning classifier model) to determine a predicted application to which the network traffic sample is expected to correspond. The model provides a predicted classification, such as a predicted application identifier for an application expected to (e.g., deemed most likely to) correspond to the network traffic or a prediction whether the corresponding traffic (e.g., domain corresponding to the access path) is malicious, or a likelihood that the traffic is malicious (e.g., whether the traffic is exploit traffic).

In some embodiments, the system implements a TF-IDF vectorization and CountVectorizer according to which each URL is converted to a list of words and the most common words that are not app specific are given less importance using IDF and words that are unique in the URL are given more importance. For example, more weight is associated with the words that are unique in connection with generating the feature vector. The system combines the feature vectors generated from each URL and uses the K nearest neighbor mechanism to identify for a new URL the closest application identifier match. The closest application identifier is classified as the application identifier for the new URL.

In some embodiments, in response to obtaining a first predicted classification from a URL ranking-based application classification (e.g., an application having a highest match count for tokens) and a second predicted classification from a machine learning-based application classification (e.g., the closest application match using a KNN model), the system determines an application to which the sample corresponds based at least in part on the first predicted classification and the second predicted classification. The system may determine whether the first predicted classification and the second predicted classification match, and in response to determining that the first predicted classification and the second predicted classification match, deeming the sample (e.g., the network traffic sample) to correspond to the app associated with the first the first predicted classification and the second predicted classification match. For example, the application identifier for such application is returned as a verdict. As an example, in response to determining that the first predicted classification and the second predicted classification do not match, the system may determine that the network traffic does not correspond to a previously analyzed application.

The use of the URL ranking-based application classification and the machine learning-based application classification mechanisms enable the system to correctly classify applications for which the network URL change frequently, thereby resulting in less traffic going unclassified. Accordingly, the system may more appropriately handle more traffic according to the applicable policies (e.g., security policies). Combining the machine learning classification with the tokenization algorithm gives much more accurate prediction of the application based on network URI logs. As an example, the false positives from traditional URI tokenization approach are double checked by the machine learning classifier and the predicted classification from the machine learning classifier output is checked by the rule system to ensure changing application traffic patterns by performing a ranking based on matches.

FIG. 1 is a block diagram of an environment in which a network traffic is classified according to various embodiments. In various embodiments, system 100 is implemented in connection with system 400 of FIG. 4, process 500 of FIG. 5, process 600 of FIG. 6, process 700 of FIG. 7, process 800 of FIG. 8, process 900 of FIG. 9, process 1000 of FIG. 10, and/or process 1100 of FIG. 11.

In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy, a network traffic handling policy, etc.) regarding communications between client devices, such as client devices 104 and 106, and nodes outside of enterprise network 110 (e.g., reachable via external network 118). Examples of such policies include policies governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. Other examples of policies include security policies (or other traffic monitoring policies) that selectively block traffic, such as traffic to malicious domains or parked domains, or such as traffic for certain applications (e.g., SaaS applications). In some embodiments, data appliance 102 is also configured to enforce policies with respect to traffic that stays within (or from coming into) enterprise network 110.

Techniques described herein can be used in conjunction with a variety of platforms (e.g., desktops, mobile devices, gaming platforms, embedded systems, etc.) and/or a variety of types of applications (e.g., Android.apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security platform 140. Security platform 140 can provide a variety of services, including classifying network traffic (e.g., identifying application(s) to which particular samples of network traffic corresponding), providing a mapping of signatures to applications/application identifiers (e.g., network traffic signatures to application identifiers), performing static and dynamic analysis on malware samples, assessing maliciousness of domains, determining whether domains are parked domains, providing a list of signatures of known exploits (e.g., malicious input strings, malicious files, malicious domains, etc.) to data appliances, such as data appliance 102 as part of a subscription, detecting exploits such as malicious input strings, malicious files, or malicious domains (e.g., an on-demand detection, or periodical-based updates to a mapping of domains to indications of whether the domains are malicious or benign), providing a likelihood that a domain is malicious (e.g., a parked domain) or benign (e.g., an unparked domain), providing/updating a whitelist of input strings, files, or domains deemed to be benign, providing/updating input strings, files, or domains deemed to be malicious, identifying malicious input strings, detecting malicious input strings, detecting malicious files, predicting whether input strings, files, or domains are malicious, and providing an indication that an input string, file, or domain is malicious (or benign). In various embodiments, results of analysis (and additional information pertaining to applications, domains, etc.) are stored in database 160. In various embodiments, security platform 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security platform 140 can be implemented across a scalable infrastructure comprising multiple such servers, solid state drives, and/or other applicable high-performance hardware. Security platform 140 can comprise several distributed components, including components provided by one or more third parties. For example, portions or all of security platform 140 can be implemented using the Amazon Elastic Compute Cloud (EC2) and/or Amazon Simple Storage Service (S3). Further, as with data appliance 102, whenever security platform 140 is referred to as performing a task, such as storing data or processing data, it is to be understood that a sub-component or multiple sub-components of security platform 140 (whether individually or in cooperation with third party components) may cooperate to perform that task. As one example, security platform 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security platform 140 but may also be provided by a third party. As one example, the virtual machine server can rely on EC2, with the remainder portions of security platform 140 provided by dedicated hardware owned by and under the control of the operator of security platform 140.

In some embodiments, network traffic classifier 170 detects/classifies network traffic. For example, the network traffic classifier determines the application (e.g., an application identifier) to which a sample of network traffic corresponds. In some embodiments, network traffic classifier 170 classifies the sample based at least in part on a signature of the sample, such as by querying a mapping of signatures to applications/application identifiers (e.g., a set of previously analyzed/classified applications). In some embodiments, network traffic classifier 170 classifies the sample based on a predicted application classification. For example, network traffic classifier 170 determines (e.g., predicts) the application classification based at least in part on (i) an access path (e.g., URL, URI, etc.) ranking-based application classification, and (ii) a machine learning-based application classification (e.g., URL application classification). In response to determining a predicted classification for a sample, network traffic classifier 170 may determine a signature for the sample and store in a mapping of signatures to applications/application identifiers the sample signature in association with the predicted classification (e.g., the predicted application identifier).

In some embodiments, system 100 (e.g., network traffic classifier 170, security platform 140, etc.) trains a model to detect (e.g., predict) traffic for applications. For example, system 100 trains a model to determine an application (e.g., an application identifier) corresponding to a particular sample of network traffic (e.g., a sample obtained from the network traffic log). System 100 performs a feature extraction and generates a set of feature vectors for training a machine learning model for detecting applications. System 100 then uses the set of feature vectors to train a machine learning model such as based on training data that includes samples of network traffic for a set of applications.

According to various embodiments, security platform 140 comprises DNS tunneling detector 138 and/or network traffic classifier 170. Security platform 140 may include various other services/modules, such as a malicious sample detector, a parked domain detector, etc. Network traffic classifier 170 is used in connection with detecting applications from samples of network traffic. For example, network traffic classifier 170 analyzes a sample (e.g., a URL from a network traffic log) and predicts an application to which the sample corresponds. In response to receiving an indication that an assessment of a sample of network traffic (e.g., an application classification) is to be performed, network traffic classifier 170 analyzes the sample determines (e.g., predicts an application classification). For example, network traffic classifier 170 determines a set of sample tokens (e.g., tokenizes the access path/URL/URI for the sample) and performs a match count analysis and ranking to determine a ranking-based predicted classification, and uses a machine learning model to determine a machine learning-based predicted classification.

In some embodiments, in connection with determining the ranking-based prediction classification, network traffic classifier 170 (i) receives an indication of a sample, (ii) obtains information pertaining the sample (e.g., an access path for the sample, such as a URL, URI, etc.), (iii) tokenizes the access path information, such as according to a predefined tokenization scheme/method, (iv) obtains a set of sample tokens based on the tokenization of the access path information, (v) perform a matching for the set of sample tokens with respect to tokens for a set of predefined applications (e.g., a catalog of previously classified applications), and (vi) determines an application that most closely matches the set of sample tokens. In some embodiments, network traffic classifier 170 determines the application that most closely matches the set of sample tokens based at least in part on a match count for a number of matches between a token in the set of sample tokens and a token for in a set of tokens for a particular application. For example, network traffic classifier 170 determines the application that most closely matches the set of sample tokens based on performing a ranking of applications according the match count for the matching of the set of sample tokens to the set of tokens for the particular application. The highest ranked application, or application for which the match count is highest, may be deemed the application that most closely matches the set of sample tokens.

In some embodiments, in connection with determining the machine learning-based prediction classification, network traffic classifier 170 (i) receives an indication of a sample, (ii) obtains information pertaining the sample (e.g., an access path for the sample, such as a URL, URI, etc.), (iii) determines a feature vector for the sample based on the information pertaining to the sample, (iv) queries a model (e.g., a machine learning model), and (v) determines an application that most closely matches the sample based on the querying the model (e.g., obtains a predicted classification). For example, network traffic classifier 170 obtains an application identifier for the application that the model deems to correspond to the sample (e.g., an application for which a prediction has a highest likelihood). In some embodiments, the determining the feature vector for the sample includes (a) parsing of the information pertaining to the sample, (ii) performing a tokenization of the information pertaining to the sample (e.g., the access path), and (iii) generating the feature vector based at least in part on the tokenization of the information pertaining to the sample. For example, network traffic classifier 170 determines the feature vector based at least in part on the frequency of the tokens. In some embodiments, network traffic classifier 170 determines the feature vector based at least in part on a term frequency-inverse document frequency (TF-IDF) for the set (or a subset) of tokens obtained by the tokenization of the access path.

In some embodiments, network traffic classifier 170 comprises one or more of traffic parser 172, prediction engine 174, traffic handling policy 176, and/or cache 178.

Traffic parser 172 is used in connection with determining a set of sample tokens for the token and/or determining a feature vector for the sample (e.g., a TF-IDF feature vector). The set of sample tokens and/or the feature vector may be determined based at least in part on performing a tokenization with respect to the sample (e.g., tokenizing the access path for the sample according to a predefined tokenization method/scheme). In some embodiments, traffic parser 172 parses the network traffic, or obtains a sample from a network traffic log, and parses the access path for the sample (e.g., the URL, URI, etc.) to obtain the set of sample tokens or other information pertaining to the sample.

Prediction engine 174 is used in connection with predicting an application classification for the sample. For example, prediction engine 174 predicts the application identifier corresponding to the sample. In some embodiments, prediction engine 174 uses a ranking-based classification mechanism in connection with a machine learning-based classification mechanism to predict the application (e.g., application identifier) to which the sample corresponds. Prediction engine 174 may generate a ranking-based predicted classification and a machine learning-based predicted classification, and determine the predicted application (e.g., predicted application identifier) based at least in part on the ranking-based predicted classification and the machine learning-based predicted classification. For example, prediction engine 174 determines whether the ranking-based predicted classification and the machine learning-based predicted classification match (e.g., the application identifier is the same for both predictions). In response to determining that the predictions match, prediction engine 174 deems the verdict (e.g., the predicted application) to be the application corresponding to the ranking-based predicted classification and/or the machine learning-based predicted classification.

In some embodiments, the model is trained using a set of features corresponding to sample traffic (e.g., sample application network traffic). The features may correspond to TF-IDF features, predefined regex statements, and/or a set of feature vectors determined based on an algorithmic-based feature extraction. For example, the model is determined based at least in part on performing a feature extraction in connection with generating (e.g., training) a model to detect applications from network traffic. The feature extraction (or a parked domain feature extraction) can include one or more of (i) using predefined regex statements to obtain specific features from webpage content for domains, (ii) using an algorithmic-based feature extraction to filter out described features from a set of raw input data, and/or (iii) tokenizing the sample (e.g., the access path) and determining a TF-IDF feature based on at least a subset of the resulting tokens.

In some embodiments, prediction engine 174 determines an application (e.g., application identifier) corresponding to a sample based at least in part on one or more of (i) a mapping of signatures to applications/application identifiers, (ii) a match count for tokens obtained from the access path for the sample in relation to tokens for a predefined set of applications, and/or (iii) a classifier (e.g., a model trained using a machine learning process), such as a machine learning model.

In connection with predicting an application classification for a sample, prediction engine 174 applies a machine learning model to determine an application/application identifier that most closely matches the sample (e.g., the application identifier that most closely matches the feature vector, such as a feature vector of tokens, for the sample). Applying the machine learning model to determine an application to which the sample corresponds includes querying the machine learning model, such as querying the model with information pertaining to the access path for the sample. As an example, the model is queried using a feature vector that is generated based on a tokenization of a URL or URI for the sample. In some implementations, the machine learning model is pre-trained and prediction engine 174 does not need to provide a set of training data (e.g., sample access paths for a set of applications, etc.) to the machine learning model. In some embodiments, prediction engine 174 receives information associated with an application to which the sample corresponds, such as an application identifier. For example, prediction engine 174 receives a result (e.g., verdict) of a determination or analysis by the machine learning model. In some embodiments, prediction engine 174 receives, from the machine learning model, an indication of a likelihood that the sample corresponds to a particular application(s). In response to receiving the indication of the likelihood that the sample corresponds to a particular application, prediction engine 174 determines (e.g., predicts) whether the sample corresponds to the particular application based on such likelihood. For example, prediction engine 174 compares the likelihood that the sample corresponds to a particular application to a likelihood threshold value. In response to a determination that the likelihood that the sample corresponds to a particular application is greater than the likelihood threshold value, prediction engine 174 may deem (e.g., determine that) the sample to correspond to the particular application.

According to various embodiments, in response to prediction engine 174 determining that the application to which sample corresponds, the system handles the sample or traffic matching the sample (e.g., a traffic having a signature the same as the sample) according to a predefined policy. For example, the system queries traffic handling policy 176 to determine the manner by which traffic matching the sample is to be handled. Traffic handling policy 176 may be a predefined policy, such as a security policy, etc. Traffic handling policy 176 may indicate that traffic for certain applications is to be blocked and traffic for other applications is to be permitted to pass through the system (e.g., routed normally). Traffic handling policy 176 may correspond to a repository of a set of policies to be enforced with respect to network traffic. In some embodiments, security platform 140 receives one or more policies, such as from an administrator or third party service, and provides the one or more policies to various network nodes, such as endpoints, security entities (e.g., inline firewalls), etc.

In response to determining an application classification for a newly analyzed sample, security platform 140 (e.g., network traffic classifier 170) sends an indication that traffic matching the sample is associated with, or otherwise corresponds to, the application. For example, security platform 140 computes a signature for the sample (e.g., a hash or other signature), and sends to a network node (e.g., a security entity, an endpoint such as a client device, etc.) an indication of the application (e.g., an application identifier) associated with the signature. For example, security platform updates a mapping of signatures to applications and provides an update to the mapping to the security entity. In some embodiments, security platform 140 further provides to the network node (e.g., security entity, client device, etc.) an indication of a manner in which traffic matching the signature is to be handled. For example, security platform 140 provides to the security entity a traffic handling policy, a security policy, or an update to a policy.

In response to receiving a sample to be analyzed, security platform 140 (e.g., network traffic classifier 170) determines the application to which the sample corresponds, such as based on a signature of the sample or based on a tokenization and prediction of the application (e.g., using a combination of the URI ranking-based mechanism and a machine learning-based mechanism). As an example, network traffic classifier 170 determines whether an identifier or representative information corresponding to the sample (e.g., a signature of the sample) is comprised in the historical information (e.g., a blacklist, a whitelist, etc.). In some embodiments, representative information corresponding to the sample is a hash or signature of the access path (or subset of the access path) for the sample. In some embodiments, network traffic classifier 170 (e.g., prediction engine 174) determines whether information pertaining to a particular sample is comprised in a dataset of historical samples (e.g., historical network traffic), whether a particular application/signature is malicious, or whether traffic corresponding to the sample to be otherwise handled in a manner different than the normal traffic handling. The historical information may be provided by a third-party service such as VirusTotal™. In response to determining that information pertaining to a sample is not comprised in, or available in, the dataset of historical samples, network traffic classifier 170 may deem that the sample/traffic has not yet been analyzed and network traffic classifier 170 can invoke an analysis (e.g., a sample analysis) of the sample (e.g., an analysis of the access path for the sample) in connection with determining (e.g., predicting) the application to which the sample corresponds (e.g., network traffic classifier 170 can query a classifier that uses a URI-ranking based prediction and a machine learning-based prediction). In some embodiments, the historical information associated with the historical samples indicating corresponding applications or a manner in which such traffic is to be handled corresponds to a social score such as a community-based score or rating (e.g., a reputation score) indicating that a domain is a parked domain or likely to be malicious. The historical information (e.g., from a third-party service, a community-based score, etc.) indicates whether other vendors or cyber security organizations deem the particular domain is a malicious or should be handled in a certain manner.

Cache 178 stores information pertaining to a sample. In some embodiments, cache 178 stores mappings of signatures to indication of the corresponding applications (e.g., an application identifier), a mapping of signatures to an indication whether the corresponding traffic is malicious, permitted, or otherwise to be handled in according to a specific policy. Cache 178 may store additional information pertaining to a set of samples such as attributes of the domains for the application, hashes or signatures corresponding to an access path of the corresponding application, other unique identifiers corresponding to a domain in the set of domains, etc.

Returning to FIG. 1, suppose that a malicious individual (using client device 120) has created malware or malicious sample 130, such as a file, an input string, etc. The malicious individual hopes that a client device, such as client device 104, will execute a copy of malware or other exploit (e.g., malware or malicious sample 130), compromising the client device, and causing the client device to become a bot in a botnet. The compromised client device can then be instructed to perform tasks (e.g., cryptocurrency mining, or participating in denial of service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). DNS server 126 is publicly accessible but under the control of the malicious operator of C&C server 150. Enterprise DNS server 122 is configured to resolve enterprise domain names into IP addresses, and is further configured to communicate with one or more external DNS servers (e.g., DNS servers 124 and 126) to resolve domain names as applicable.

As mentioned above, in order to connect to a legitimate domain (e.g., www.example.com depicted as website 128), a client device, such as client device 104 will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier that implements a pre-filter model, such as in connection with detecting malicious or suspicious samples, detecting parked domains, or otherwise determining that certain detected network traffic is to be further analyzed (e.g., using a finer detection model).

In various embodiments, when a client device (e.g., client device 104) attempts to resolve an SQL statement or SQL command, or other command injection string, data appliance 102 uses the corresponding sample (e.g., an input string) as a query to security platform 140. This query can be performed concurrently with the resolution of the SQL statement, SQL command, or other command injection string. As one example, data appliance 102 can send a query (e.g., in the JSON format) to a frontend 142 of security platform 140 via a REST API. Using processing described in more detail below, security platform 140 will determine whether the queried SQL statement, SQL command, or other command injection string indicates an exploit attempt and provide a result back to data appliance 102 (e.g., "malicious exploit" or "benign traffic").

In various embodiments, when a client device (e.g., client device 104) attempts to open a file or input string that was received, such as via an attachment to an email, instant message, or otherwise exchanged via a network, or when a client device receives such a file or input string, DNS module 134 uses the file or input string (or a computed hash or signature, or other unique identifier, etc.) as a query to security platform 140. This query can be performed contemporaneously with receipt of the file or input string, or in response to a request from a user to scan the file. As one example, data appliance 102 can send a query (e.g., in the JSON format) to a frontend 142 of security platform 140 via a REST API. Using processing described in more detail below, security platform 140 will determine (e.g., using a malicious file detector that may use a machine learning model to detect/predict whether the file is malicious) whether the queried file is a malicious file (or likely to be a malicious file) and provide a result back to data appliance 102 (e.g., "malicious file" or "benign file").

In some embodiments, network traffic classifier 170 provides to a security entity, such as data appliance 102, an indication the application corresponding to the sample (e.g., the application that most closely matches the network traffic for the sample). For example, in response to detecting the application, network traffic classifier 170 sends an indication of the application to data appliance 102, and the data appliance 102 may in turn enforce one or more policies (e.g., security policies) based at least in part on the indication that the traffic corresponds to the application (e.g., that traffic has the same signature as the sample). The one or more security policies may include isolating/quarantining the content (e.g., webpage content) for the domain, blocking access to the domain (e.g., blocking traffic for the domain), isolating/deleting the domain access request for the domain, ensuring that the domain is not resolved, alerting or prompting the user of the client device the maliciousness of the domain prior to the user viewing the webpage, etc. As another example, in response to determining the application for the sample, network traffic classifier 170 provides to the security entity an update of a mapping of signatures to applications (e.g., application identifiers).

Figure 2:
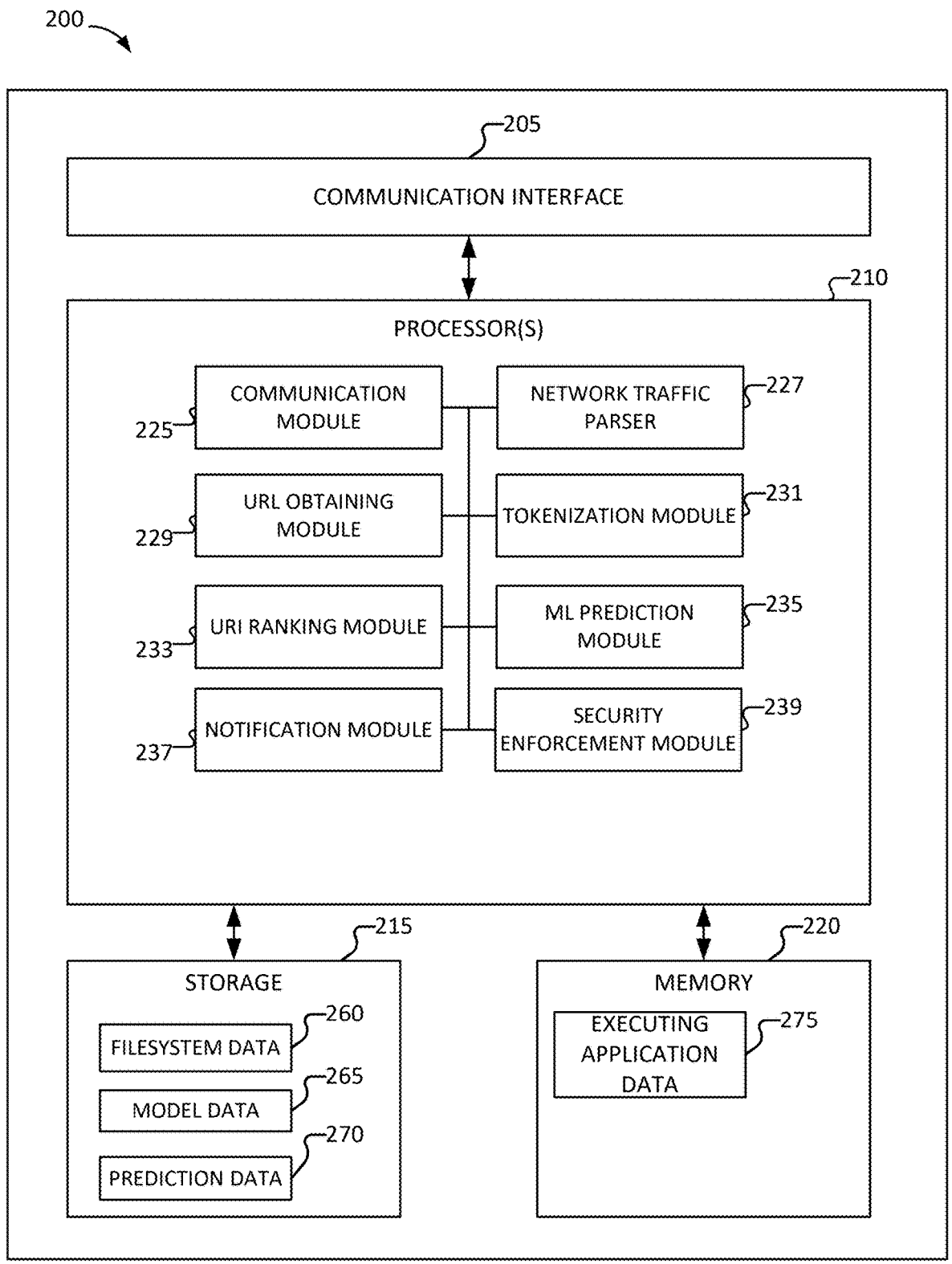
FIG. 2 is a block diagram of a system to classify a sample of network traffic according to various embodiments.

FIG. 2 is a block diagram of a system to classify a sample of network traffic according to various embodiments. According to various embodiments, system 200 is implemented in connection with system 100 of FIG. 1, such as for network traffic classifier 170. In various embodiments, system 200 is implemented in connection with system 400 of FIG. 4, process 500 of FIG. 5, process 600 of FIG. 6, process 700 of FIG. 7, process 800 of FIG. 8, process 900 of FIG. 9, process 1000 of FIG. 10, and/or process 1100 of FIG. 11. System 200 may be implemented in one or more servers, a security entity such as a firewall, and/or an endpoint.

System 200 can be implemented by one or more devices such as servers. System 200 can be implemented at various locations on a network. In some embodiments, system 200 implements network traffic classifier 170 of system 100 of FIG. 1. As an example, system 200 is deployed as a service, such as a web service (e.g., system 200 determines whether an input string or received file is malicious, and provides such determinations as a service). The service may be provided by one or more servers. For example, system 200 or network traffic classifier is deployed on a remote server that monitors or receives network traffic that is transmitted within or into/out of a network and determines the application to which the network traffic corresponds or whether the traffic is malicious, and sends/pushes out notifications or updates pertaining to the network traffic such as an indication of the application to which the network traffic corresponds or an indication of whether an application is malicious. As another example, the network traffic classifier is deployed on a firewall. In some embodiments, part of system 200 is implemented as a service (e.g., a cloud service provided by one or more remote servers) and another part of system 200 is implemented at a security entity or other network node such as a client device.

In some embodiments, system 200 (i) receives network traffic, (ii) predicts an application to which the network traffic corresponds based at least in part on a ranking-based application classification, (iii) predicts an application to which the network traffic corresponds based at least in part on a machine-learning based application classification, and (iv) predicts the application based at least in part on the ranking-based application classification prediction and the machine-learning based application classification prediction. System 200 can perform an active measure (or cause an active measure to be performed) in response to determining the application to which the network traffic corresponds.

In the example shown, system 200 implements one or more modules in connection with predicting whether a domain is a parked domain, determining a likelihood that the domain is a parked domain, and/or providing a notice or indication of whether a domain is a parked domain. System 200 comprises communication interface 205, one or more processors 210, storage 215, and/or memory 220. One or more processors 210 comprises one or more of communication module 225, network traffic parser 227, URL obtaining module 229, tokenization module 231, URI ranking module 233, ML prediction module 235, notification module 237, and security enforcement module 239.

In some embodiments, system 200 comprises communication module 225. System 200 uses communication module 225 to communicate with various nodes or end points (e.g., client terminals, firewalls, DNS resolvers, data appliances, other security entities, etc.) or user systems such as an administrator system. For example, communication module 225 provides to communication interface 205 information that is to be communicated (e.g., to another node, security entity, etc.). As another example, communication interface 205 provides to communication module 225 information received by system 200. Communication module 225 is configured to receive an indication of samples (e.g., URLs, URIs, network traffic, etc.) to be analyzed (or domain access requests indicating a domain), such as from network endpoints or nodes such as security entities (e.g., firewalls), database systems, query systems, etc. Communication module 225 is configured to obtain an access path for a sample to be analyzed. Communication module 225 is configured to query third party service(s) for information pertaining to the applications or network traffic (e.g., services that expose information for domains such as third-party scores or assessments of maliciousness of domains or applications, a community-based score, assessment, or reputation pertaining to domains or applications, a blacklist for domains or applications, and/or a whitelist for domains or applications, etc.). For example, system 200 uses communication module 225 to query the third-party service(s). Communication module 225 is configured to receive one or more settings or configurations from an administrator. Examples of the one or more settings or configurations include configurations of a process determining whether an application is permitted, malicious, benign, etc., a format or process according to which a feature vector is to be determined, a set of feature vectors to be provided to a classifier for determining the application to which the sample of network traffic corresponds, a set of regex statements for which feature vectors are to be determined (e.g., a set of predefined regex statements, or an update to a stored set of regex statements, etc.), a set of predefined signatures to be assessed or counted, information pertaining to a whitelist of domains or applications (e.g., applications that are not deemed suspicious or malicious), information pertaining to a blacklist of domains or applications (e.g., applications that are deemed to be suspicious or malicious and for which traffic is to be quarantined, deleted, or otherwise to be restricted from being executed/transmitted), etc.

In some embodiments, system 200 comprises network traffic parser 227. System 200 uses network traffic parser 227 to obtain information comprised in a network traffic log, such as a set of access paths (e.g., URLs, URIs, etc.). Network traffic parser 227 may obtain network traffic, parse the network traffic to obtain information pertaining to traffic for different applications, such as records for the network traffic log. In some embodiments, network traffic parser 227 obtains the information pertaining to network traffic (e.g., information comprised in a network traffic log) from a security entity (e.g., an inline firewall, etc.). For example, network traffic parser 227 obtain a sample (e.g., sample of the network traffic) that is to be analyzed (e.g., for which system 200 is to determine/predict the corresponding application).

In some embodiments, system 200 comprises URL obtaining module 229. System 200 uses URL obtaining module 229 to obtain the access path associated with a sample of network traffic to be analyzed. For example, URL obtaining module 229 obtains a URL comprised in the sample. Various other types of access paths may be obtained, such as a URI, etc.

In some embodiments, system 200 comprises tokenization module 231. System 200 uses tokenization module 231 to tokenize the access path (e.g., the URL, URI, etc.) associated with (e.g., comprised in) the sample. In some embodiments, tokenization module 231 implements a predefined tokenization process/mechanism. The predefined tokenization process may include identifying separators. The identifying the separators may include determining a type of separator(s) used within the access path and/or determining a location of the separator(s) within the access path. Examples of separators may include a colon, a period, a forward slash, a backwards slash, a predefined string, a hyphen, etc. Various other separator(s) may be implemented and detected. In some embodiments, the tokenization process includes identifying the top-level domain or top-level private domain. As an example, the top-level domain or top-level private domain may be excluded from the tokenization (or the resulting token may be discarded/disregarded), however, the top-level domain or top-level private domain may be used in connection with determining a set of possible applications to which the sample may correspond (e.g., system 200 may iterate over the set of applications mapped to such domain and determine whether the sample corresponds to any of such applications).

In some embodiments, in response to identifying the top-level domain (e.g., top-level private domain), tokenization module 231 tokenizes the remaining subdomains and/or access path. The tokenizing the remaining subdomains and/or access path may include respectively extracting alphanumeric strings that are delineated by the separator(s) within the access path.

As an illustrative example, for a URL equal to boardpackager.box.com/app-redir/login/z-app-value, tokenization module 231 converts the URL to the following tokens: 'boardpackager'; 'box'; 'com'; 'app-redir'; 'login'; and 'z-app-value'. As another illustrative example, for a URL equal to slackcom/api/files.list, tokenization module 231 converts the URL to the following tokens: 'slack'; 'com'; 'api'; 'files'; and 'list'. In some embodiments, tokenization module 231 may also discard/ignore certain tokens which may be generic across network traffic, such as 'www', 'com', etc. As another illustrative example, for a URL equal to slack.com/api/subteams.membership, tokenization module 231 converts the URL to the following tokens: 'slack'; 'com'; 'api'; 'subteams'; and 'membership'.

In some embodiments, system 200 comprises URI ranking module 233. System 200 uses URI ranking module 233 to determine a ranking-based predicted classification (e.g., a URL ranking-based prediction, a URI ranking-based prediction, etc.). URI ranking module 233 determines the ranking-based predicted classification based at least in part on the set of sample tokens obtained by tokenizing the access path for the sample.

In some embodiments, URI ranking module 233 obtains the set of sample tokens (e.g., that are generated by tokenization module 231) The URI ranking-based application classification includes obtaining access path information (e.g., the URI or URL) comprised in the sample. In response to obtaining the access path information, URI ranking module 233 tokenizes the access path information, such as according to a predefined tokenization scheme/method. URI ranking module 233 obtains a set of sample tokens based on the tokenization of the access path information. URI ranking module 233 uses the set of sample tokens to perform a matching with respect to tokens for a set of predefined applications (e.g., a catalog of previously classified applications). For example, URI ranking module 233 query matches the set of sample tokens against sets of tokens for applications mapped to the top-level private domain. URI ranking module 233 may use the top-level private domain to determine the set of possible applications against which a comparison of the set of sample tokens is to be performed. The predicted classification associated with the URI ranking-based application classification may be the application of the set of predefined applications to which the sample most closely matches (e.g., based on a matching of corresponding tokens). For example, URI ranking module 233 determines the application that most closely matches the sample (e.g., based on the set of sample tokens) and deems such application as the ranking-based predicted classification.

In some embodiments, system 200 comprises ML prediction module 235. System 200 uses ML prediction module 235 to determine a machine learning-based predicted classification (e.g., to perform the machine-learning application classification). ML prediction module 235 determines the machine learning-based predicted classification based at least in part querying a classifier (e.g., a machine learning model) that is trained to predict an application classification based on information pertaining to a sample, such as an access path for the sample or a set of sample tokens obtained from a tokenization of the access path.

In some embodiments, ML prediction module 235 generates a feature vector based on information pertaining to the sample. ML prediction module 235 uses the feature vector in connection with querying the classifier for a machine-learning predicted classification. In some embodiments, ML prediction module 235 determines the feature vector for the access path (e.g., the URI or URL) based at least in part on performing a tokenization of the access path (e.g., based on at least in part on one or more tokens of the set of sample tokens obtained by tokenization module 231). As an example, the feature vector may be based at least in part on the frequency of the tokens. In some embodiments, ML prediction module 235 determines the feature vector based at least in part on a term frequency-inverse document frequency (TF-IDF) for the set (or a subset) of tokens obtained by the tokenization of the access path. For example, ML prediction module 235 converts a URL (or tokens obtained by tokenizing the URL) to a vector based on the frequency count of each token (e.g., each word or alphanumeric string parsed from the URL). ML prediction module 235 may remove outliers from the set of tokens from which the feature vector is generated. For example, ML prediction module 235 may exclude the token (e.g., words, alphanumeric strings, etc.) that has the highest frequency, and exclude the token that has the lowest frequency. As another example, ML prediction module 235 may exclude a predefined number (or predefined percentage) of tokens that are the set of N highest frequency tokens and a predefined number of tokens that are the set of M lowest frequency tokens, where N and M are integers.

According to various embodiments, ML prediction module 235 implements a classifier (e.g., a machine learning model) to classify the network traffic (e.g., an obtained sample or record from a network traffic log) based on the feature vector. System 200 may train the classifier, or system 200 may obtain the classifier from a service. The classifier is trained based at least in part on a machine learning process. Examples of machine learning processes that can be implemented in connection with training the classifier(s) include random forest, linear regression, support vector machine, naive Bayes, logistic regression, K-nearest neighbors (KNN), decision trees, gradient boosted decision trees, K-means clustering, hierarchical clustering, density-based spatial clustering of applications with noise (DBSCAN) clustering, principal component analysis, etc. In some embodiments, system 200 implements a KNN model. As an example, ML prediction module 235 inputs the feature vector (e.g., the TF-IDF feature vector) to the classifier (e.g., the KNN machine learning classifier model) to determine a predicted application to which the network traffic sample is expected to correspond. The classifier provides a predicted classification (e.g., a machine learning-based predicted classification), such as a predicted application identifier for an application expected to (e.g., deemed most likely to) correspond to the network traffic or a prediction of whether the corresponding traffic (e.g., domain corresponding to the access path) is malicious, or a likelihood that the traffic is malicious (e.g., whether the traffic is exploit traffic).

In some embodiments, system 200 comprises notification module 237. System 200 uses notification module 237 to provide an indication of the predicted application (e.g., an application identifier that system 200 deems to be the application to which the sample corresponds). For example, system 200 obtains a ranking-based predicted classification and a machine-learning based predicted classification. System 200 determines, based at least in part on one or more of the ranking-based predicted classification and the machine-learning based predicted classification, a verdict (e.g., a predicted classification) for a predicted application to which the sample corresponds.

System 200 may use notification module 237 to provide to one or more security entities (e.g., a firewall), nodes, or endpoints (e.g., a client terminal) an update to a whitelist of domains and/or a blacklist of domains, or whitelist/blacklist of applications. According to various embodiments, notification module 237 obtains a hash, signature, or other unique identifier associated with the domain (e.g., a webpage for the domain) or network traffic, and provides the indication of whether the sample is malicious in connection with the hash, signature, or other unique identifier associated with the sample.

According to various embodiments, the hash of a domain corresponds to a hash of the domain name, the IP address, or website content for the domain using a predetermined hashing function (e.g., an MD5 hashing function, etc.). A security entity or an endpoint may compute a hash of a received domain. The security entity or an endpoint may determine whether the computed hash corresponding to the domain is comprised within a set such as a whitelist of benign domains, and/or a blacklist of domains, etc. If a signature for a received domain (e.g., a domain subject to an access request) is included in the set of signatures for parked domains (e.g., a blacklist of parked domains), the security entity or an endpoint can prevent the transmission of website content for the domain, or otherwise prevent access to the domain.

In some embodiments, system 200 comprises security enforcement module 239. System 200 uses security enforcement module 239 to enforce one or more security policies with respect to information such as network traffic, domain access requests, input strings, files, etc. As an example, system 200 uses security enforcement module 239 to perform an active measure with respect to the network traffic in response to detecting the application corresponding to the network traffic. Security enforcement module 239 enforces the one or more security policies based on whether the sample is determined to be malicious. As an example, in the case of system 200 being a security entity or firewall, system 200 comprises security enforcement module 239. Firewalls typically deny or permit network transmissions based on a set of rules. These sets of rules are often referred to as policies (e.g., network policies, network security policies, security policies, etc.). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as are described herein). A firewall can also filter local network (e.g., intranet) traffic by similarly applying a set of rules or policies. Other examples of policies include security policies such as ones requiring the scanning for threats in incoming (and/or outgoing) email attachments, website content, files exchanged through instant messaging programs, information obtained via a web interface or other user interface such as an interface to a database system (e.g., an SQL interface), and/or other file transfers.

According to various embodiments, storage 215 comprises one or more of filesystem data 260, model data 265, and/or prediction data 270. Storage 215 comprises a shared storage (e.g., a network storage system) and/or database data, and/or user activity data.

In some embodiments, filesystem data 260 comprises a database such as one or more datasets (e.g., one or more datasets for domains, datasets comprising samples of network traffic, mappings of indications for network traffic or predicted applications for network traffic to the network traffic or hashes, signatures or other unique identifiers of the network traffic, such as a signature for the domains, mappings of indicators of benign applications or domains to domains or hashes, signatures or network traffic, etc.). Filesystem data 260 comprises data such as historical information pertaining to domains or network traffic, a whitelist of domains deemed to be safe (e.g., not suspicious, benign, unparked domains, etc.), a blacklist of domains deemed to be parked domains or otherwise suspicious or malicious, a whitelist of applications deemed to be safe, a blacklist of applications that are deemed to be malicious or otherwise prohibited, such as by a predefined security policy (e.g., the application is not approved by an organization), etc.

Model data 265 comprises information pertaining to one or more models used to predict an application classification for network traffic or a domain, or to predict a likelihood that the network traffic corresponds to a particular application. As an example, model data 265 stores the classifier (e.g., a KNN machine learning classifier model(s) such as a detection model) used in connection with a set of feature vectors or a combined feature vector. Model data 265 comprises a feature vector that may be generated with respect to one or more characteristics of the network traffic, such as tokens extracted from the access path. In some embodiments, model data 265 comprises a combined feature vector that is generated based at least in part on one or more feature vectors corresponding to the network traffic (e.g., one or more samples of the network traffic).

Prediction data 270 comprises information pertaining to a predicted application classifications for network traffic, such as predicted application classifications for access paths extracted from the network traffic. For example, prediction data 270 stores an indication of the application to which the network traffic corresponds, an indication of a likelihood that the application corresponds to a particular application, an indication of the ranking-based application classification prediction, an indication of the machine-learning based application classification prediction, etc. The information pertaining to a determination can be obtained by notification module 237 and provided in response to the classification (e.g., communicated to the applicable security entity, endpoint, or other system). In some embodiments, prediction data 270 comprises hashes or signatures for domains such as domains that are analyzed by system 200 to determine whether such domains are parked domains, or a historical dataset that has been previously assessed to determine whether the domains are parked domains, such as historical determinations provided by a third party. Prediction data 270 can include a mapping of hash values or other identifiers associated with network traffic (e.g., access paths) to indications of the application to which such network traffic/access path corresponds.

According to various embodiments, memory 220 comprises executing application data 275. Executing application data 275 comprises data obtained or used in connection with executing an application such as an application executing a hashing function, an application to extract information from webpage content, an input string, an application to extract information from a file, or other sample, etc. In embodiments, the application comprises one or more applications that perform one or more of receive and/or execute a query or task, generate a report and/or configure information that is responsive to an executed query or task, and/or provide to a user information that is responsive to a query or task. Other applications comprise any other appropriate applications (e.g., an index maintenance application, a communications application, a machine learning model application, an application for detecting suspicious input strings, suspicious files, an application for detecting suspicious or unparked domains, an application for detecting malicious network traffic or malicious/non-compliant applications such as with respect to a corporate security policy, a document preparation application, a report preparation application, a user interface application, a data analysis application, an anomaly detection application, a user authentication application, a security policy management/update application, etc.).

FIG. 3 is a diagram of chart of a tokenization and a frequency-inverse document frequency (TF-IDF) vectorization. In the example shown, chart 300 indicates the tokens and TF-IDF values generated based on four samples (also referred to as "document"): (i) slack.com/api/files.list, (ii) slack.com/api/subteams.membership, (iii) slack.com/apilinks.getDomains, and (iv) slack.com/api/client.counts.

Various embodiments implement a ranking-based application and a machine learning-based application classification in connection with predicting an application to which certain samples of network traffic correspond. In connection with classifying samples (e.g., URLs), various embodiments implement a TF-IDF vectorization and count vectorizer. Each URL is tokenized, such as by converting the URL to a list of words. In the TF-IDF vectorization, the system allocates weighting to tokens such that most common words that are not application-specific are given less importance using the IDF (e.g., the words are given a relatively lower weighting), and words that are unique in the URL are given relatively more importance using the IDF (e.g., the words are given a relatively higher weighting).

In some embodiments, the machine-learning based application classification implements a KNN mechanism to predict an application classification for a new document (e.g., a new access path/URL obtained in the network traffic) based on a feature vector generated based on the tokenization and TF-IDF of the tokens/words.

Figure 4:
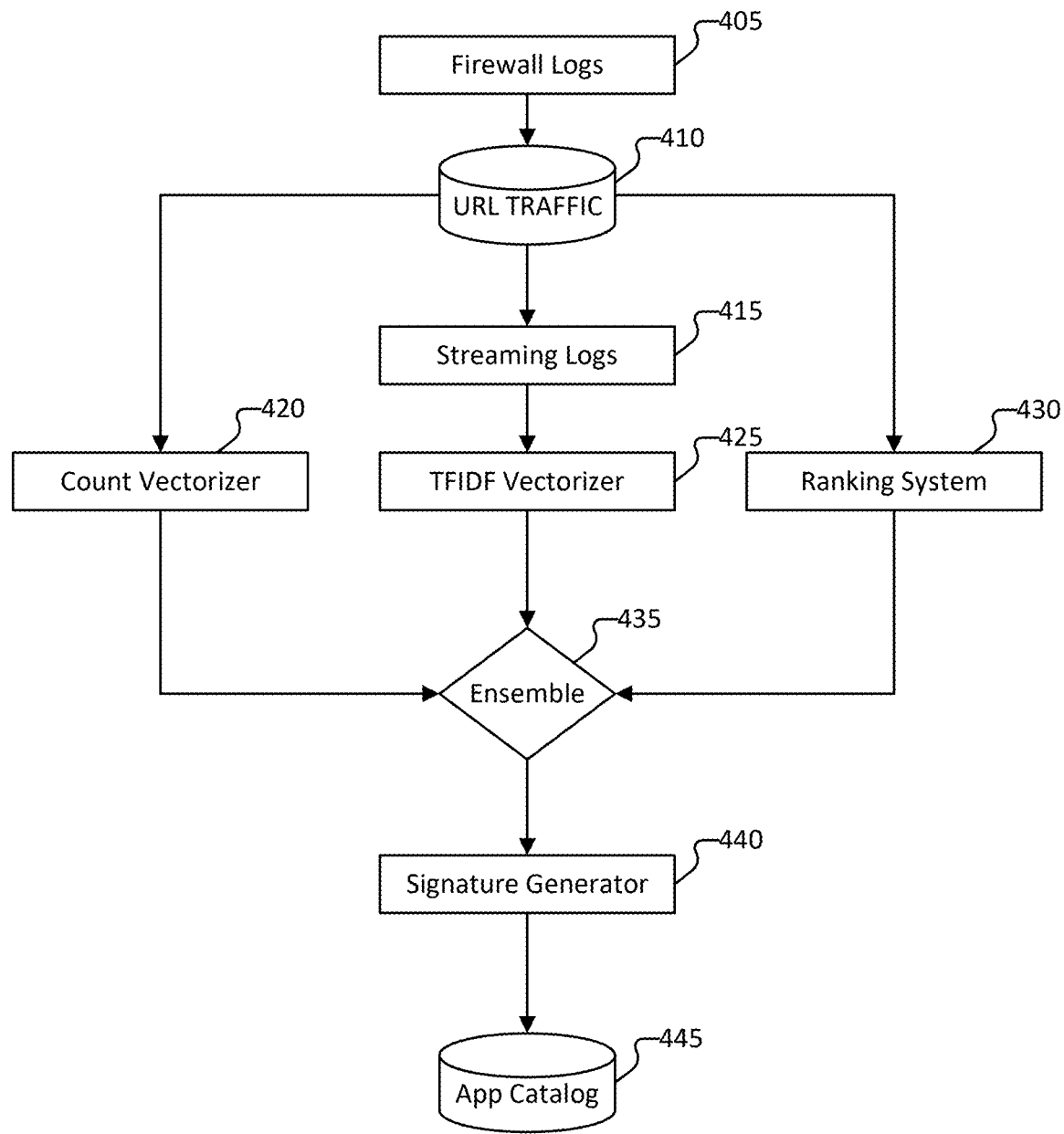
FIG. 4 illustrates a system for classifying a sample of network traffic according to various embodiments.

FIG. 4 illustrates a system for classifying a sample of network traffic according to various embodiments. In the example shown, system 400 obtains network traffic such as from firewall logs 405. For example, system 400 extracts information pertaining to URL traffic and stores the information in URL traffic dataset 410. System 400 implements two machine learning-based application classifications and a ranking-based application classification. The network traffic may be tokenized before providing such information to the machine learning-based application classifications and the ranking-based application classification, or each of the mechanisms may respectively tokenize the network traffic, such as based on a predefined tokenization process/algorithm.

A first machine learning-based application classification mechanism uses count vectorizer 420 to determine a feature vector(s) based on the URL traffic in URL traffic dataset 410. The first machine learning-based application classification mechanism may generate a feature vector based on a count of tokens/words comprised in an access path extracted from the network traffic. The first machine learning-based application classification uses a model to predict an application classification based at least in part on the feature vector obtained based on a count analysis. As an example, the first machine learning-based application classification converts a URL to a vector on the basis of the frequency (e.g., the count) of each token/word. The first machine learning-based application classification may remove tokens/words that appear too frequent from consideration of the machine learning model.

A second machine learning-based application classification mechanism uses TF-IDF vectorizer 425 to generate a feature vector based at least in part on URL traffic obtained from URL traffic dataset 410. For example, the second machine learning-based application obtains streaming logs 415 from the URL traffic dataset 410, performs an TF-IDF analysis with respect to tokens/words comprised in an access path for the streaming log, and generates a TF-IDF feature vector. The second machine learning-based application classification uses a model to predict an application classification based at least in part on the TF-IDF feature vector.

A ranking-based application classification uses ranking system 430 to obtain tokens/words from a tokenization of the network traffic. For example, the system extracts the top-most private domain from a URL and tokenizes the remaining subdomains (e.g., at least up to two levels of sub-domains). In connection with system 400 implementing ranking-based application classification, system 400 (e.g., ranking system 430) may run a query match against the tokens (e.g., the tokens for the subdomain(s)) to determine (e.g., identify) the possible applications matching the tokens. System 400 iterates through each matching application and for each URL in the dataset (e.g., the dataset of predefined URL samples identified as being associated with applications) system 400 compares the tokens from the sample being analyzed against the tokens for the particular URL. System 400 determines a total number of matches between tokens for the sample being analyzed and tokens for a particular pre-identified application. Ranking system 430 classifies the sample (e.g., the network traffic) as corresponding to the application for which the sample tokens have the highest match count.

System 400 uses the results (e.g., the application classification predictions) output by the first machine learning-based application classification mechanism (e.g., count vectorizer 420), the second machine learning-based application classification mechanism (e.g., TF-IDF vectorizer 425), and the ranking-based application classification mechanism (e.g., ranking system 430) to determine the predicted application classification.

In some embodiments, system 400 uses ensemble module 435 to assess whether the predicted application classifications from the various application classification mechanisms match. In response to determining that the predicted application classifications match, ensemble module 435 determines that the sample being analyzed (e.g., the URL sample obtained from URL traffic dataset 410) corresponds to the application predicted by the various application classification mechanisms.

In some embodiments, system 400 uses ensemble module 435 to determine a predicted application classification. The predicted application classification, ensemble module 435 uses a predefined function that is based at least in part on the results from the various application classification mechanisms. As an example, the predefined function may comprise weightings associated with the results from the various application classification mechanisms. As another example, the results from the application classification mechanisms comprises a set of likelihoods that a sample matches a particular set of applications (e.g., pre-identified/pre-classified applications), and the predicted application corresponds to the application having a highest aggregated likelihood or value from the predefined function.

In response to classifying the sample (e.g., predicting the application classification for the URL sample(s)), system 400 uses signature generator 440 to generate a signature for the sample. For example, signature generator 440 computes a hash or other signature for the URL/access path being analyzed. In response to generating the hash or other signature, system 400 stores the hash or other signature to app catalog 445. In some embodiments, system 400 stores the hash or other signature in mapping of hashes/signatures to applications. The mapping of hashes/signatures to applications may be used by the system to perform a lookup for previously classified applications so the system can quickly classify network traffic (e.g., based on hashing the URL/access path and querying the mapping).

Figure 5:
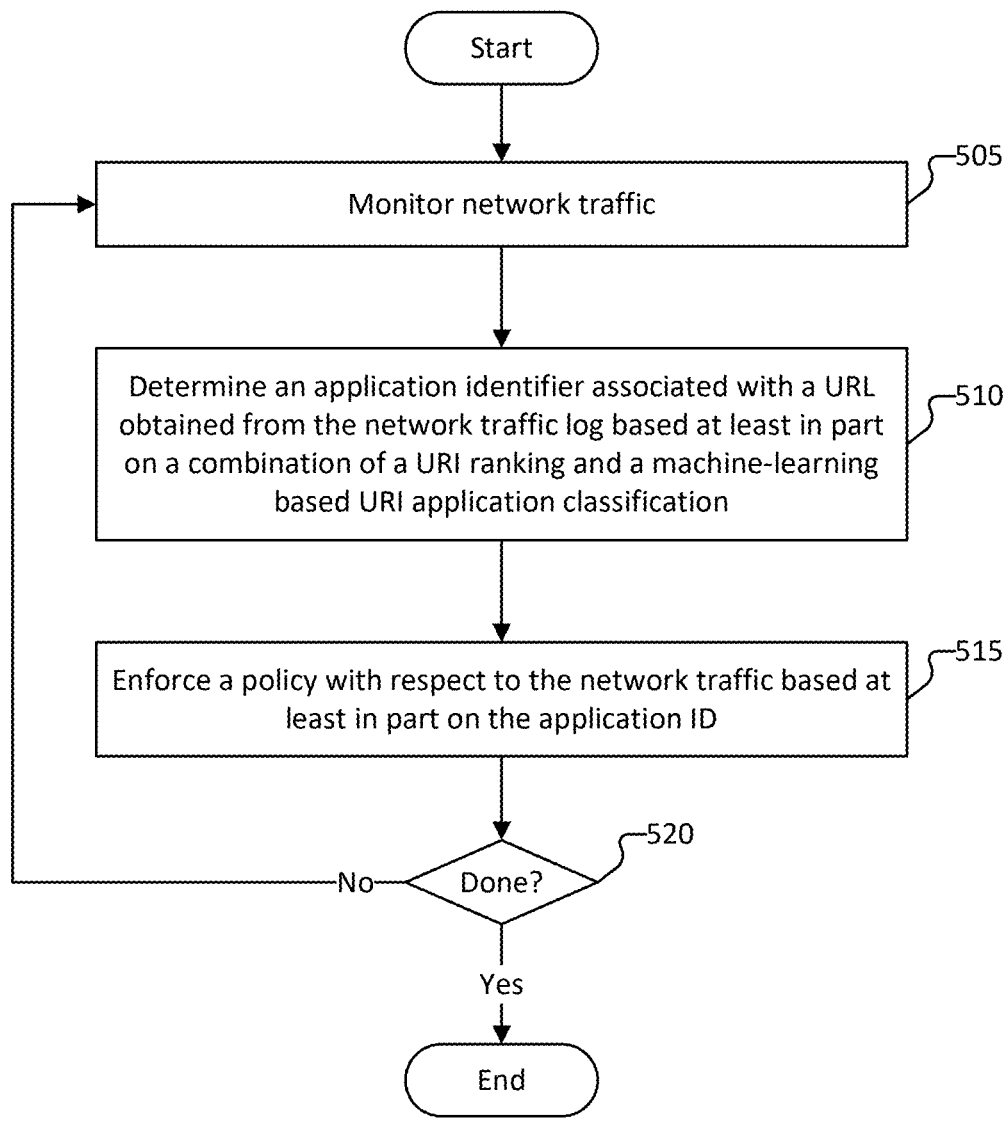
FIG. 5 is a flow diagram of a method for handling network traffic according to various embodiments.

FIG. 5 is a flow diagram of a method for handling network traffic according to various embodiments. In some embodiments, process 500 is implemented at least in part by system 100 of FIG. 1, system 200 of FIG. 2, and/or system 400 of FIG. 4.

At 505, network traffic is monitored. In some embodiments, the system obtains access paths/URLs from the network traffic. For example, the system obtains the access paths/URLs from network traffic logs (e.g., logs generated based on firewall mediating traffic across a network). At 510, an application identifier is determined. The system determines the application identifier associated with a URL obtained from the network traffic log based at least in part on a combination of a URI ranking and a machine learning-based URI application classification(s). At 515, a policy with respect to the network traffic is enforced based at least in part on the application ID. In response to determining the application to which network traffic corresponds, the system may query a mapping of applications to policies for handling traffic in connection with determining how to handle the classified network traffic. At 520, a determination is made as to whether process 500 is complete. In some embodiments, process 500 is determined to be complete in response to a determination that no further samples are to be analyzed (e.g., no further predictions for samples are needed), no further traffic is to be analyzed, an administrator indicates that process 500 is to be paused or stopped, etc. In response to a determination that process 500 is complete, process 500 ends. In response to a determination that process 500 is not complete, process 500 returns to 505.

Figure 6:
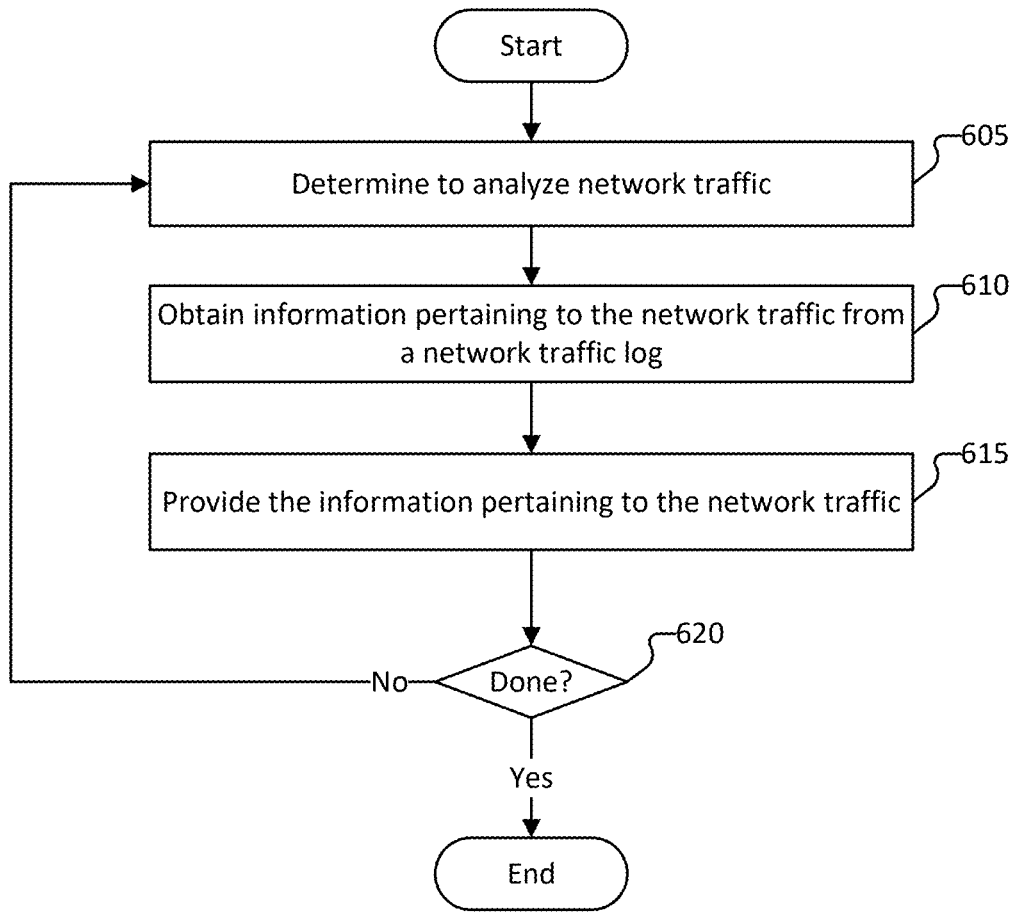
FIG. 6 is a flow diagram of a method for monitoring network traffic according to various embodiments.

FIG. 6 is a flow diagram of a method for monitoring network traffic according to various embodiments. In some embodiments, process 600 is implemented at least in part by system 100 of FIG. 1, system 200 of FIG. 2, and/or system 400 of FIG. 4. In some embodiments, process 600 is invoked by 505 of process 500.

At 605, the system determines to analyze network traffic. At 610, information pertaining to the network traffic is obtained from a network traffic log. In response to determining that network traffic is to be analyzed, such as by a firewall or a system/service invoked by the firewall (or other security entity), the system obtains information pertaining to the network traffic from a network traffic log or from other information captured by a security entity. At 615, the information pertaining to network traffic is provided. As an example, the system provides the information pertaining to the network traffic to the system or service that invoked process 600, such as to the system running process 500. At 620, a determination is made as to whether process 600 is complete. In some embodiments, process 600 is determined to be complete in response to a determination that no further samples are to be analyzed (e.g., no further predictions for samples are needed), no further traffic is to be analyzed, an administrator indicates that process 600 is to be paused or stopped, etc. In response to a determination that process 600 is complete, process 600 ends. In response to a determination that process 600 is not complete, process 600 returns to 605.

Figure 7:
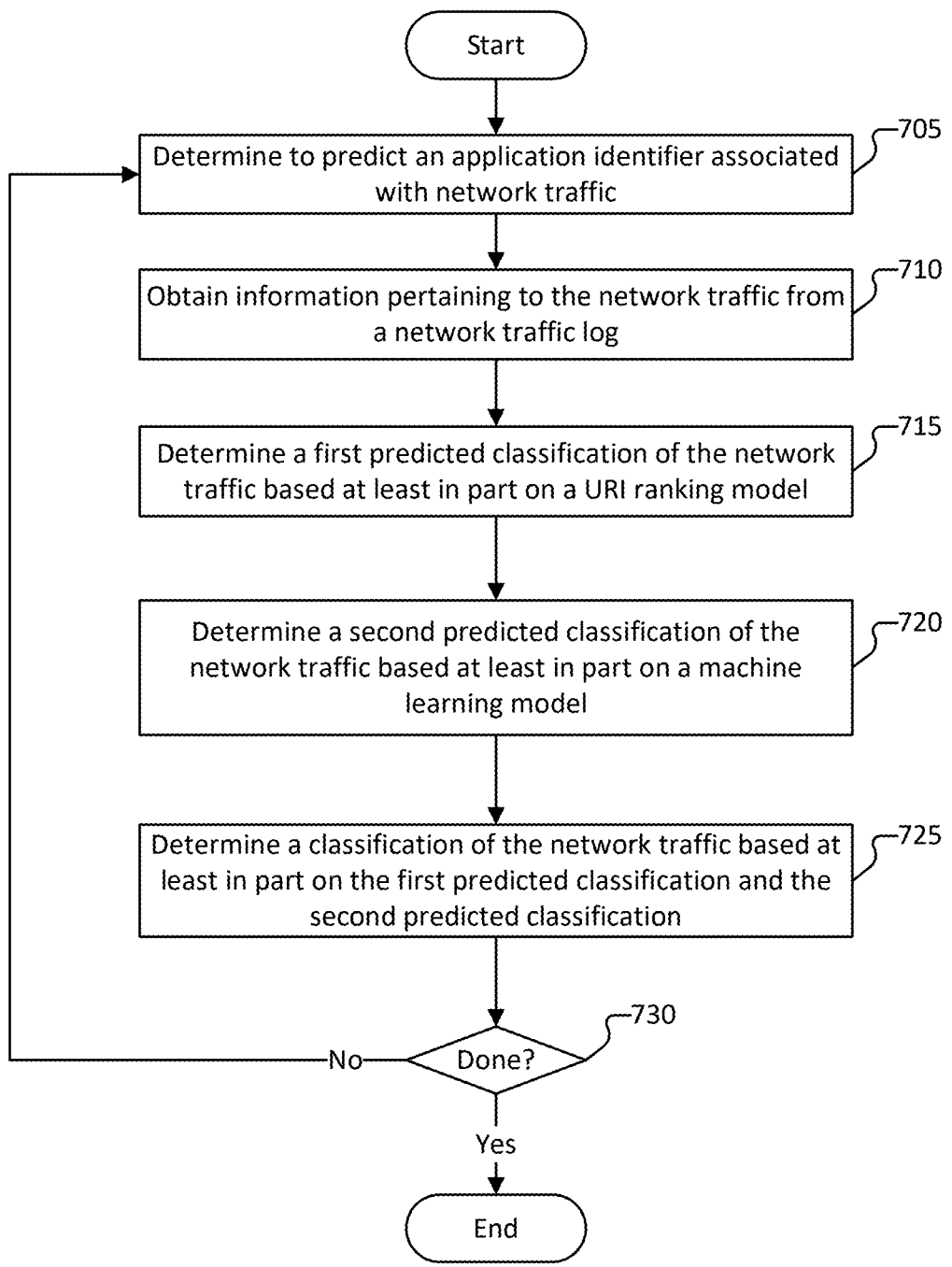
FIG. 7 is a flow diagram of a method for classifying a sample of network traffic according to various embodiments.

FIG. 7 is a flow diagram of a method for classifying a sample of network traffic according to various embodiments. In some embodiments, process 700 is implemented at least in part by system 100 of FIG. 1, system 200 of FIG. 2, and/or system 400 of FIG. 4. In some embodiments, process 700 is invoked by 505 of process 500. Process 700 may receive the information pertaining to network traffic from process 600. In some embodiments, 705 and/or 710 invokes process 600.

At 705, the system determines to predict an application identifier associated with the network traffic. At 710, information pertaining to the network traffic from a network traffic log is obtained. In response to determining that that the system is to classify network traffic (e.g., determine the application to which the network traffic corresponds), the system obtains the information pertaining to the network traffic from a network traffic log, such as a log managed by a security system (e.g., a security entity, such as a firewall). At 715, a first predicted classification of the network traffic is determined based at least in part on a URL ranking model. In some embodiments, the system tokenizes the URL/access path (e.g., obtained from the network traffic) and performs a matching of the tokens corresponding to the URL/access path with a set of tokens for a set of applications (e.g., set of pre-classified applications). The URL ranking model may deem the application from the set of applications having the most matching tokens to be the predicted classification for the URL/access path (e.g., the application to which the URL/access path corresponds). At 720, a second predicted classification of the network traffic is determined based at least in part on a machine learning model. In some embodiments, the system determines a TF-IDF feature vector based at least in part on a tokenization of the URL/access path (e.g., a TF-IDF feature vector is formed for the tokens corresponding to the URL/access path). In response to obtaining the TF-IDF feature vector, the system uses a model to classify the network traffic (e.g., generate a prediction of the application to which the network traffic corresponds). The model is a machine learning model, such as a KNN. At 725, a classification of the network traffic is determined based at least in part on the first predicted classification and the second predicted classification. The system determines the application to which the network traffic corresponds based on an ensemble of the first predicted classification and the second predicted classification. For example, in response to determining that first predicted classification and the second predicted classification match, the system deems such the network traffic to apply to the application according to such classification. Although the example described uses two predicted classification, various embodiments may implement an application classification that uses more than two predicted classifications (e.g., a ranking-based model and a plurality of machine learning-based models may be used to generate a prediction). At 730, a determination is made as to whether process 700 is complete. In some embodiments, process 700 is determined to be complete in response to a determination that no further samples are to be analyzed (e.g., no further predictions for samples are needed), no further traffic is to be analyzed, an administrator indicates that process 700 is to be paused or stopped, etc. In response to a determination that process 700 is complete, process 700 ends. In response to a determination that process 700 is not complete, process 700 returns to 705.

Figure 8:
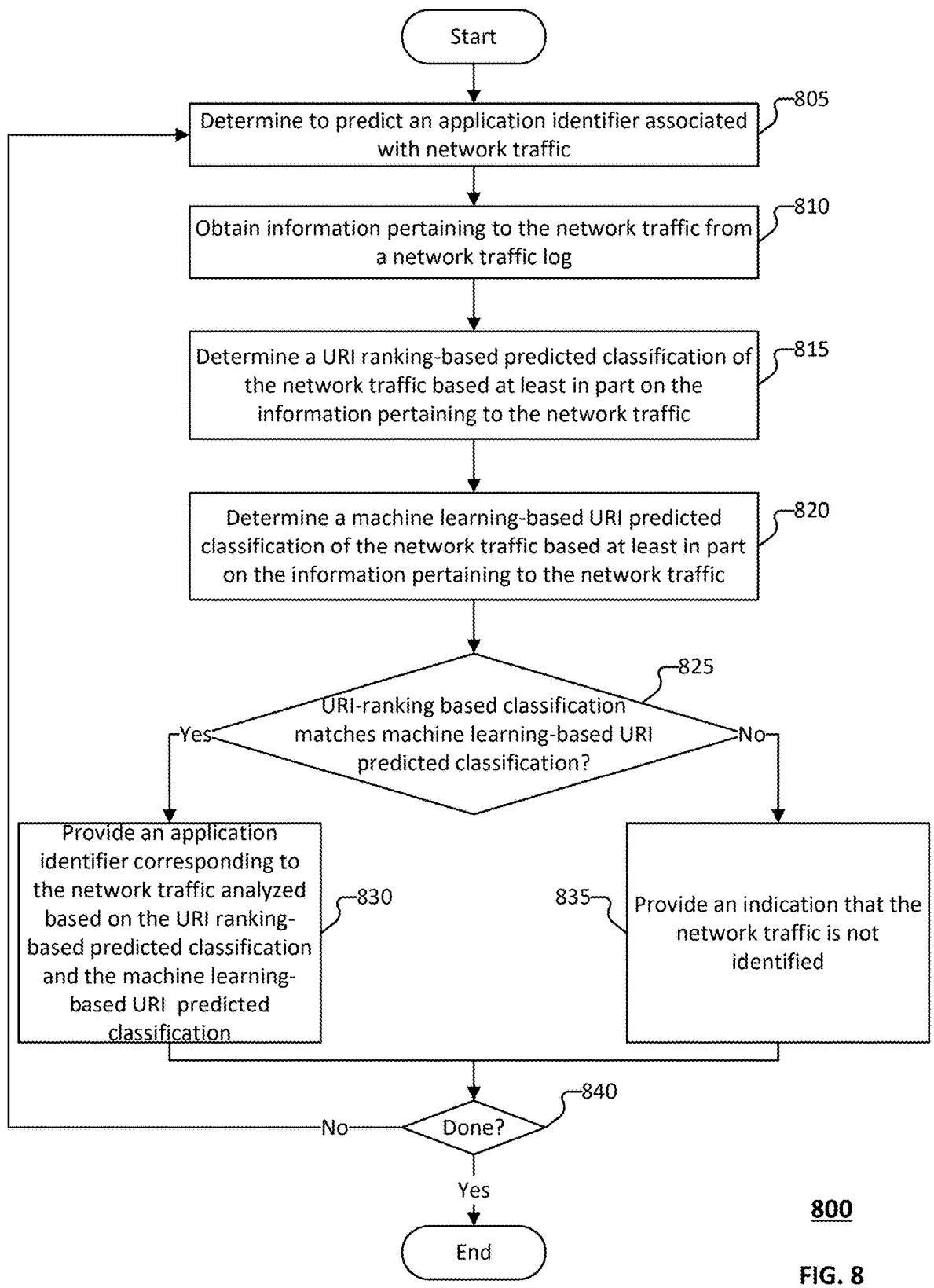
FIG. 8 is a flow diagram of a method for classifying a sample of network traffic according to various embodiments.

FIG. 8 is a flow diagram of a method for classifying a sample of network traffic according to various embodiments. In some embodiments, process 800 is implemented at least in part by system 100 of FIG. 1, system 200 of FIG. 2, and/or system 400 of FIG. 4. In some embodiments, process 800 is invoked by 505 of process 500. Process 800 may receive the information pertaining to network traffic from process 600. In some embodiments, 805 and/or 810 invokes process 600.

At 805, the system determines to predict an application identifier associated with network traffic. At 810, information pertaining to the network traffic is obtained from a network traffic log. At 815, the system determines a URI-ranking-based predicted classification of the network traffic based at least in part on the information pertaining to the network traffic. At 820, the system determines a machine learning-based URI predicted classification of the network traffic based at least in part on the information pertaining to the network traffic. At 825, the system determines whether the URI-ranking based classification matches the machine learning-based URI predicted classification. In response to determining that the URI-ranking based classification matches the machine learning-based URI predicted classification at 825, process 800 proceeds to 830. Conversely, in response to determining that the URI-ranking based classification does not match the machine learning-based URI predicted classification at 825, process 800 proceeds to 835. At 830, the system provides an application identifier corresponding to the network traffic analyzed based on the URI ranking-based prediction classification and the machine learning-based URI predicted classification. At 835, the system provides an indication that the network traffic is not identified. At 840, a determination is made as to whether process 800 is complete. In some embodiments, process 800 is determined to be complete in response to a determination that no further samples are to be analyzed (e.g., no further predictions for samples are needed), no further traffic is to be analyzed, an administrator indicates that process 800 is to be paused or stopped, etc. In response to a determination that process 800 is complete, process 800 ends. In response to a determination that process 800 is not complete, process 800 returns to 805.

Figure 9:
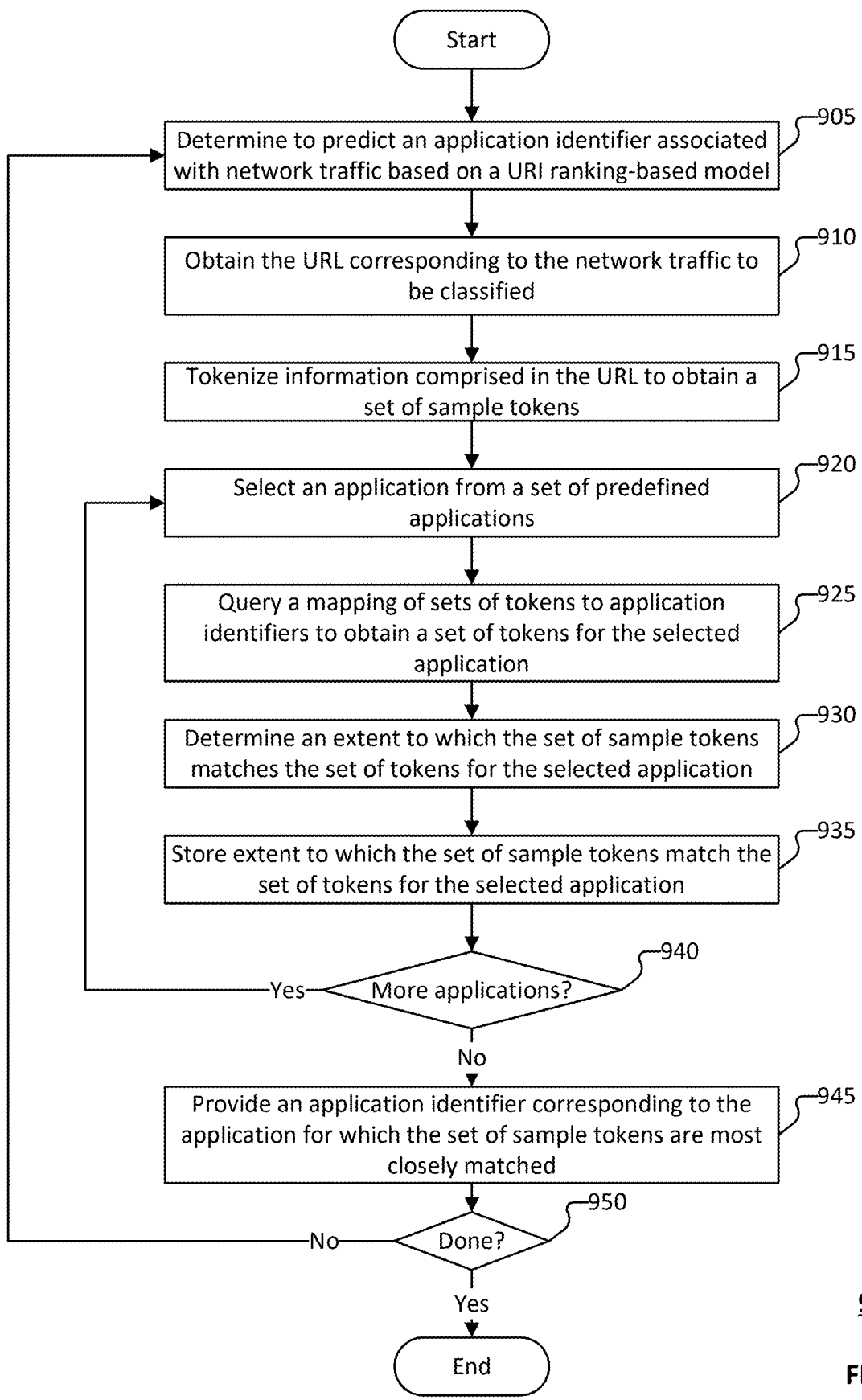
FIG. 9 is a flow diagram of a method for classifying a sample of network traffic based on a URI ranking according to various embodiments.

FIG. 9 is a flow diagram of a method for classifying a sample of network traffic based on a URI ranking according to various embodiments. In some embodiments, process 900 is implemented at least in part by system 100 of FIG. 1, system 200 of FIG. 2, and/or system 400 of FIG. 4. In some embodiments, process 900 is invoked by 715 of process 700 and/or 815 of process 800.

At 905, the system determines to predict an application identifier associated with network traffic based at least in part on a URI ranking-based model. At 910, the URL corresponding to the network traffic to be classified is obtained. At 915, information comprised in the URL is tokenized to obtain a set of sample tokens. The set of tokens may correspond to a set of words/tokens for the sub-domains in the URL. At 920, an application is selected from a set of predefined applications. At 925, a mapping of set of tokens to application identifiers is queried to obtain a set of tokens for the selected application. At 930, the system determines the extent to which the sample tokens match the set of tokens for the selected application. At 935, the extent to which the set of sample tokens match the set of tokens for the selected application is stored. At 940, the system determines whether more applications for which an extent to which the set of sample tokens match are to be analyzed. In response to determining that more applications are to be analyzed at 940, process 900 returns to 920 and process 900 iterates over 920-940 until the system determines that no further applications are to be analyzed. Conversely, in response to determining that no further applications from the set of predefined applications are to be analyzed at 940, process 900 proceeds to 945. At 945, an application identifier corresponding to the application for which the set of sample tokens are most closely matched is provided. At 950, a determination is made as to whether process 900 is complete. In some embodiments, process 900 is determined to be complete in response to a determination that no further samples are to be analyzed (e.g., no further predictions for samples are needed), no further traffic is to be analyzed, an administrator indicates that process 900 is to be paused or stopped, etc. In response to a determination that process 900 is complete, process 900 ends. In response to a determination that process 900 is not complete, process 900 returns to 905.

Figure 10:
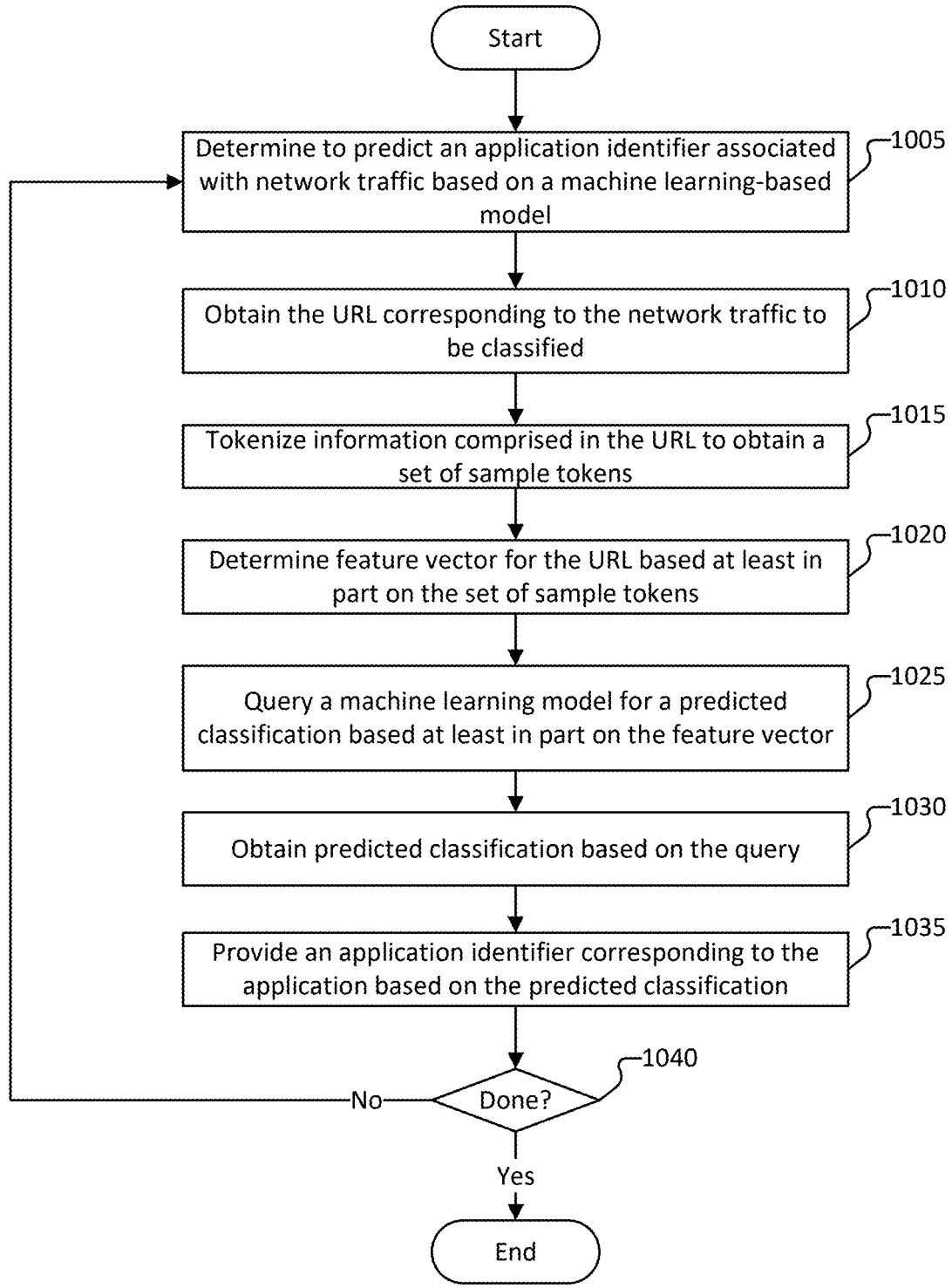
FIG. 10 is a flow diagram of a method for classifying a sample of network traffic based on a machine learning model according to various embodiments.

FIG. 10 is a flow diagram of a method for classifying a sample of network traffic based on a machine learning model according to various embodiments. In some embodiments, process 900 is implemented at least in part by system 100 of FIG. 1, system 200 of FIG. 2, and/or system 400 of FIG. 4. In some embodiments, process 900 is invoked by 720 of process 700 and/or 80 of process 800.

At 1005, the system determines to predict an application identifier associated with the network traffic based at least in part on a URI ranking-based model. At 1010, the system obtains the URL corresponding to the network traffic to be classified. At 1015, information comprised in the URL is tokenized to obtain a set of sample tokens. At 1020, a feature vector for the URL is determined based at least in part on the set of sample tokens. As an example, the feature vector corresponds to a feature vector generated using a TF-IDF analysis of at least a subset of the set of sample tokens. At 1025, a machine learning model is queried for a predicted classification based at least in part on the feature vector. At 1030, the predicted classification is obtained based at least in part on the query. At 1035, an application identifier corresponding to the application is provided based at least in part on the predicted classification. At 1040, a determination is made as to whether process 1000 is complete. In some embodiments, process 1000 is determined to be complete in response to a determination that no further samples are to be analyzed (e.g., no further predictions for samples are needed), no further traffic is to be analyzed, an administrator indicates that process 1000 is to be paused or stopped, etc. In response to a determination that process 1000 is complete, process 1000 ends. In response to a determination that process 1000 is not complete, process 1000 returns to 1005.

Figure 11:
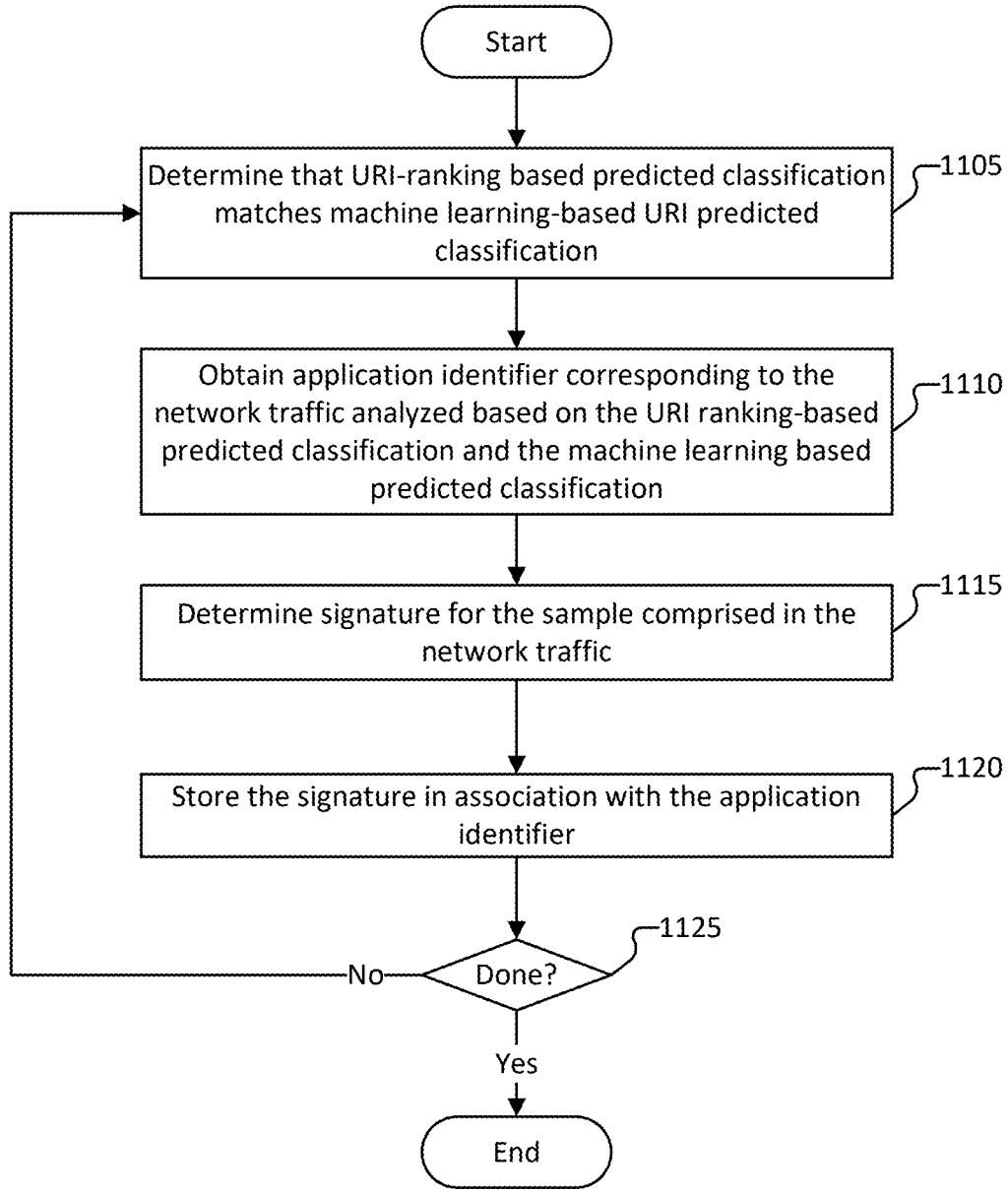
FIG. 11 is a diagram of a maintaining a mapping of signatures for samples of network traffic to application identifiers according to various embodiments.

FIG. 11 is a diagram of a maintaining a mapping of signatures for samples of network traffic to application identifiers according to various embodiments. In some embodiments, process 900 is implemented at least in part by system 100 of FIG. 1, system 200 of FIG. 2, and/or system 400 of FIG. 4. In some embodiments, process 900 is invoked in connection with 725 of process 700 and/or 830 of process 800.

At 1105, the system determines that the URI-ranking based classification matches a machine learning-based URI predicted classification. At 1110, an application identifier corresponding to the network traffic analyzed is obtained based at least in part on the URI ranking-based predicted classification and the machine learning-based predicted classification. At 1115, a signature for the sample comprised in the network traffic is determined. The signature may be determined according to a predefined signature or hashing algorithm/process. At 1120, the signature is stored in association with the application identifier. For example, the system stores the signature association with the application identifier in a mapping of applications (e.g., application identifiers) to the signature. At 1125, a determination is made as to whether process 1100 is complete. In some embodiments, process 1100 is determined to be complete in response to a determination that no further samples are to be analyzed (e.g., no further predictions for samples are needed), no further traffic is to be analyzed, an administrator indicates that process 1100 is to be paused or stopped, etc. In response to a determination that process 1100 is complete, process 1100 ends. In response to a determination that process 1100 is not complete, process 1100 returns to 1105.

Various examples of embodiments described herein are described in connection with flow diagrams. Although the examples may include certain steps performed in a particular order, according to various embodiments, various steps may be performed in various orders and/or various steps may be combined into a single step or in parallel.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for classifying network traffic, comprising:
one or more processors configured to:
monitor network traffic, wherein the monitored network traffic is stored in a network traffic log; and
determine an application identifier (ID) associated with a URL obtained from the network traffic log based at least in part on the ensemble of (a) a URI ranking-based prediction classification for the URL, and (b) a machine learning based URI application classification; and
enforce a policy with respect to network traffic based at least in part on the application ID; and
a memory coupled to the one or more processors and configured to provide the one or more processors with instructions.

2. The system of claim 1, wherein the policy comprises a security policy.

3. The system of claim 2, wherein the security policy indicates a manner by which the network traffic corresponding to the application ID is to be handled by a security entity or an edge device.

4. The system of claim 1, wherein the machine learning-based URI application classification is determined based at least in part on using a machine learning model to classify the network traffic.

5. The system of claim 4, wherein the machine learning model is a k-nearest neighbor (KNN) model.

6. The system of claim 1, wherein determining the application ID associated with the URL obtained from the network traffic log based at least in part on the ensemble of (a) a URI ranking-based prediction classification for the URL, and (b) a machine learning based URI application classification, comprises:
obtaining a URI ranking based at least in part on the URL;
obtaining a machine learning-based URI application classification;
determining whether a highest ranked URI in the URI ranking and the machine learning-based URI application classification match; and
in response to determining that the highest ranked URI and the machine learning-based URI application classification match,
determining the application ID based on an application corresponding to the highest ranked URI or the machine learning-based URI application classification match; and
determining that the network traffic corresponds to an application corresponding to the application ID.

7. The system of claim 6, wherein the URI ranking is obtained based at least in part on tokenizing information comprised in the URL.

8. The system of claim 7, wherein:
one or more tokens are obtained based on the tokenizing the information comprised in the URL;
compare the one or more tokens to a set of tokens in a token repository for a plurality of URIs; and
determine a ranking of at least a subset of the plurality of URIs according to an extent to which the one or more tokens obtained based on the tokenizing the information comprised in the URL match tokens associated with the at least the subset of the plurality of URIs.

9. The system of claim 8, wherein the ranking of the at least the subset of the plurality of URIs is determined based on ranking the URIs of the plurality of URIs based at least in part on match count.

10. The system of claim 7, wherein:
one or more tokens are obtained based on the tokenizing the information comprised in the URL;
compare the one or more tokens to a set of tokens in a token repository for a plurality of URIs; and
determine a URI for which the one or more tokens most closely match tokens respectively associated with at least a subset of URIs of the plurality of URIs.

11. The system of claim 1, wherein determining the machine learning-based URI application classification comprises:
determining a frequency-inverse document frequency (TF-IDF) feature vector based at least in part on the URL; and
classifying the URL based at least in part on analyzing the TF-IDF feature vector using a machine learning model.

12. The system of claim 11, wherein analyzing the TF-IDF feature vector using the machine learning model comprises obtaining a predicted classification for the URL.

13. The system of claim 1, wherein determining the machine learning-based URI application classification comprises:
   determining a list of words comprised in the URL; and
   classifying the URL based at least in part on a machine learning model and the list of words.

14. The system of claim 13, wherein the classifying the URL based at least in part on a machine learning model and the list of words comprises:
   determining a feature vector based at least in part on the list of words; and
   using the machine learning model to predict a URI application classification based at least in part on the feature vector.

15. The system of claim 13, wherein the classifying the URL based at least in part on a machine learning model and the list of words comprises:
   using a supervised classifier to identify a new URL for an application identifier for an application that most closely matches the network traffic.

16. The system of claim 1, wherein determining an application identifier (ID) associated with a URL obtained from the network traffic log based at least in part on the ensemble of (a) a URI ranking-based prediction classification for the URL, and (b) a machine learning based URI application classification, comprises:
   obtaining a first result based at least in part on determining a closest-matched application using a URI ranking model;
   obtaining a second result corresponding to a classification prediction of a machine learning-based URI application classification model; and
   in response to determining that the first result and the second result match, deeming the first result as the application identifier.

17. A method for classifying network traffic, comprising:
   monitoring, by one or more processors, network traffic, wherein the monitored network traffic is stored in a network traffic log;
   determining an application identifier (ID) associated with a URL obtained from the network traffic log based at least in part on an ensemble of (a) a URI ranking-based prediction classification for the URL, and (b) a machine learning based URI application classification; and
   enforcing a policy with respect to network traffic based at least in part on the application ID.

18. A computer program product embodied in a non-transitory computer readable medium for classifying network traffic, and the computer program product comprising computer instructions for:
   monitoring, by one or more processors, network traffic, wherein the monitored network traffic is stored in a network traffic log;
   determining an application identifier (ID) associated with a URL obtained from the network traffic log based at least in part on an ensemble of (a) a URI ranking-based prediction classification for the URL, and (b) a machine learning based URI application classification; and
   enforcing a policy with respect to network traffic based at least in part on the application ID.

19. A system for classifying network traffic, comprising:
   one or more processors configured to:
      monitor network traffic, wherein the monitored network traffic is stored in a network traffic log; and
      determine an application identifier (ID) associated with a URL obtained from the network traffic log based at least in part on a combination of a URI ranking and a machine learning-based URI application classification, wherein determining the application ID associated with the URL obtained from the network traffic log based at least in part on the combination of a URI ranking and a machine learning-based URI application classification comprises:
         obtaining a URI ranking based at least in part on the URL;
         obtaining a machine learning-based URI application classification;
         determining whether a highest ranked URI in the URI ranking and the machine learning-based URI application classification match; and
         in response to determining that the highest ranked URI and the machine learning-based URI application classification match,
            determining the application ID based on an application corresponding to the highest ranked URI or the machine learning-based URI application classification match; and
            determining that the network traffic corresponds to an application corresponding to the application ID; and
      enforce a policy with respect to network traffic based at least in part on the application ID; and
   a memory coupled to the one or more processors and configured to provide the one or more processors with instructions.

20. A method for classifying network traffic, comprising:
   monitoring, by one or more processors, network traffic, wherein the monitored network traffic is stored in a network traffic log;
   determining an application identifier (ID) associated with a URL obtained from the network traffic log based at least in part on a combination of a URI ranking and a machine learning based URI application classification, wherein determining the application ID associated with the URL obtained from the network traffic log based at least in part on the combination of a URI ranking and a machine learning-based URI application classification comprises:
      obtaining a URI ranking based at least in part on the URL;
      obtaining a machine learning-based URI application classification;
      determining whether a highest ranked URI in the URI ranking and the machine learning-based URI application classification match; and
      in response to determining that the highest ranked URI and the machine learning-based URI application classification match,
         determining the application ID based on an application corresponding to the highest ranked URI or the machine learning-based URI application classification match; and
         determining that the network traffic corresponds to an application corresponding to the application ID; and
   enforcing a policy with respect to network traffic based at least in part on the application ID.

* * * * *